United States Patent [19]

Ishizuka et al.

[11] Patent Number: 6,101,809
[45] Date of Patent: Aug. 15, 2000

[54] EXHAUST GAS PURIFYING SYSTEM OF INTERNAL COMBUSTION ENGINE

[75] Inventors: Yasuji Ishizuka, Kanagawa; Kimiyoshi Nishizawa, Yokohama, both of Japan

[73] Assignee: Nissan Motor Co., Ltd., Yokohama, Japan

[21] Appl. No.: 09/137,840

[22] Filed: Aug. 21, 1998

[30] Foreign Application Priority Data

Aug. 21, 1997 [JP] Japan ................................. 9-225327
Aug. 21, 1997 [JP] Japan ................................. 9-225328

[51] Int. Cl.$^7$ ........................................ F01N 3/00
[52] U.S. Cl. ............................. 60/276; 60/285; 60/295; 123/674; 701/109; 701/115
[58] Field of Search .................. 60/276, 285, 274, 60/295, 297; 123/674; 701/115, 103, 109

[56] References Cited

U.S. PATENT DOCUMENTS

| | | | |
|---|---|---|---|
| 4,761,950 | 8/1988 | Nagai et al. | 60/274 |
| 5,335,493 | 8/1994 | Uchida et al. | 60/274 |
| 5,337,557 | 8/1994 | Toyota | 60/276 |
| 5,473,887 | 12/1995 | Takeshima et al. | 60/276 |
| 5,483,945 | 1/1996 | Kobayashi et al. | 123/674 |
| 5,778,666 | 7/1998 | Cullen et al. | 60/274 |

FOREIGN PATENT DOCUMENTS 7-139397  5/1995  Japan .

*Primary Examiner*—Thomas Denion
*Assistant Examiner*—Binh Tran
*Attorney, Agent, or Firm*—Foley & Lardner

[57] ABSTRACT

To optimally operate a NOx-occluded type catalytic converter installed in an exhaust passage of an internal combustion engine, there are employed an air/fuel ratio sensor for detecting an exhaust air/fuel ratio of the exhaust gas downstream of the converter; and a control device for controlling an air/fuel ratio of a combustible mixture fed to the engine. The control device comprises a first section for causing the converter to effect NOx-reduction treatment by making the air/fuel ratio of the combustible mixture richer and/or stoichiometric; and a second section for learning and correcting the condition of the NOx-reduction treatment, based on the exhaust air/fuel ratio detected by the sensor under the NOx-reduction treatment.

20 Claims, 16 Drawing Sheets

EXHAUST GAS PURIFYING SYSTEM OF INTERNAL COMBUSTION ENGINE

BACKGROUND OF THE INVENTION

1. Field of the Invention

The present invention relates in general to exhaust gas purifying systems of an internal combustion engine and more particularly to exhaust gas purifying systems of a type which has a NOx-occluded type three-way catalytic converter installed in an exhaust passage extending from the engine. More specifically, the present invention is concerned with a control system employed in the exhaust gas purifying system of the above-mentioned type for controlling an air/fuel ratio of a mixture to a level appropriate for effectively purifying NOx in the exhaust gas.

2. Description of the Prior Art

Internal combustion engines having a NOx-occluded type three-way catalytic converter installed in an exhaust passage have been known, one of which is described in Japanese Patent First Provisional Publication 7-139397.

As is known, the NOx-occluded type three-way catalytic converter has such a performance that when the exhaust gas from the engine shows a higher air/fuel ratio (viz., lean), the converter occludes NOx in the exhaust gas, while when the exhaust gas shows a stoichiometric or lower air/fuel ratio (viz., rich), the converter releases NOx allowing reduction of the same with the aid of HC and CO in the exhaust gas.

For ease of description, the NOx-occluded type three-way catalytic converter will be referred to as NOx-occluded converter in the following.

That is, under lean combustion of the engine, the NOx-occluded converter occludes NOx thereby reducing NOx in the exhaust gas actually discharged to the open air. However, when the amount of NOx occluded by the converter comes up to a maximum occluding capacity of the converter, NOx in the exhaust gas from the engine would be directly discharged to the open air without being occluded by the converter. For dealing with this undesired phenomenon, a so-called "rich spike control" has been proposed wherein when the amount of NOx occluded by the NOx-occluded converter is determined to come up to the maximum occluding capacity, the target air/fuel ratio of a mixture fed to the engine is temporarily changed to a lower side (viz., richer side) to force the converter to release NOx for reduction of the same. Usually, the determination of the maximum occluding capacity of the converter is made based on an engine load, an engine speed, an air/fuel ratio of the mixture, etc.

SUMMARY OF THE INVENTION

However, in the exhaust gas purifying systems of the type using the above-mentioned rich spike control, the rich spike action is conducted without making a strict consideration on a time-caused deterioration of the NOx-occluded converter and a time-caused and/or random changing of the NOx exhausting characteristics of the engine. Thus, due to this reason, such exhaust gas purifying systems have failed to exhibit a satisfied rich spike control.

That is, when, due to the rich spike action, a richer exhaust gas (viz., exhaust gas with a lower air/fuel ratio) is applied to the NOx-occluded converter, NOx occluded in an upstream portion of the converter is instantly released and thereafter NOx occluded in a downstream portion of the converter is gradually released with passage of time. Paying attention to this phenomenon, in the known purifying system, a control is so made that the rich level of the exhaust gas is set high at an initial stage of the rich spike control and thereafter the rich level is gradually lowered for a given time.

However, if the rich level at the initial stage of the rich spike control is not sufficiently high and thus the amount of HC and CO (which serve as reducers for NOx) in the exhaust gas is not sufficient, NOx released from the converter would fail to be sufficiently reduced resulting in that a certain amount of NOx is discharged to the open air. While, if the rich level at the initial stage is too high and thus the amount of HC and CO in the exhaust gas is too large, an excessive amount of HC and CO would be discharged to the open air although NOx released at the initial stage of the control is sufficiently reduced.

Furthermore, if the period for which the rich condition of the exhaust gas from the engine is kept is too short, NOx tends to remain in the converter without being sufficiently reduced and thus, the NOx occluding capacity of the converter prepared for a subsequent lean combustion of the engine is lowered. That is, in this case, the NOx occluding capacity of the converter is substantially lowered. While, if the rich condition keeping time (or period) of the exhaust gas is too long, a large amount of HC and CO would be inevitably discharged to the open air once NOx occluded by the converter is entirely released and reduced. When, under such condition, the amount of NOx having been occluded by the converter is small, a marked amount of HC and CO would be discharged to the open air.

The present invention is provided by taking the above-mentioned various facts into consideration.

It is an object of the present invention to provide an exhaust gas purifying system having a NOx-occluded type catalytic converter installed in an exhaust passage of an internal combustion engine, which can optimally control the rich spike action for purification of NOx in the exhaust gas even when the characteristics of the NOx-occluded converter and the emission exhausting characteristics of the engine are subjected to change, so that purification of NOx and suppression of discharge of HC and CO are both effectively achieved at the same time.

According to the present invention, there is provided an exhaust gas purifying system of an internal combustion engine. The engine has an air/fuel mixture supply device by which a combustible mixture fed to the engine is provided. The exhaust gas purifying system has a NOx-occluded type catalytic converter installed in an exhaust passage through which an exhaust gas from the engine passes. The converter occludes NOx in the exhaust gas when the exhaust gas shows a leaner air/fuel ratio and releases and reduces NOx with an aid of HC and CO in the exhaust gas when the exhaust gas shows a richer and/or stoichiometric air/fuel ratio. An air/fuel ratio sensor is provided for detecting an exhaust air/fuel ratio of the exhaust gas downstream of the converter. A control device is provided for controlling an air/fuel ratio of the combustible mixture. The control device comprises a first section for causing the converter to effect NOx-reduction treatment on the absorbed or adsorbed NOx by making the air/fuel ratio of the combustible mixture richer and/or stoichiometric; and a second section for learning and correcting the condition of the NOx-reduction treatment, based on the exhaust air/fuel ratio detected by the sensor under the NOx-reduction treatment.

DETAILED DESCRIPTION OF THE EMBODIMENTS

Referring to FIGS. 1 to FIG. 9D, there is shown a first embodiment of the present invention.

Figure 1:
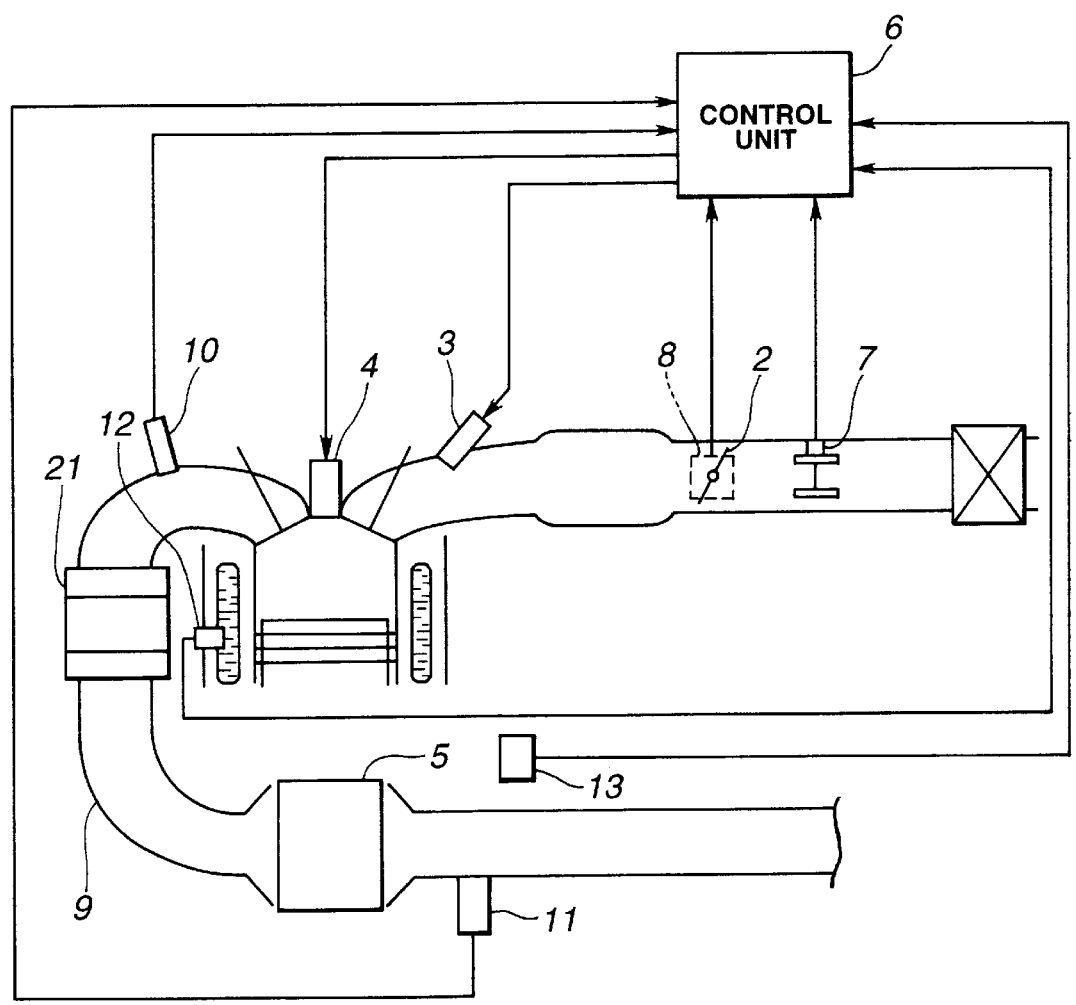
FIG. 1 is a schematic view of an internal combustion engine to which the present invention is practically applied.

In FIG. 1, there is schematically shown an internal combustion engine 1 to which the present invention is practically applied. A throttle valve 2 is installed in an intake passage to feed a combustion chamber of the engine 1 with a metered air. A fuel injector 3 is projected into the intake passage to inject a metered fuel in the intake passage. Thus, before entering the combustion chamber, the metered fuel and the metered air are mixed to form a combustible air/fuel mixture. The air/fuel mixture led into the combustion chamber is ignited by an ignition plug 4 and burnt to produce an exhaust gas. The exhaust gas is led to an exhaust passage 9 and treated or purified by an NOx-occluded converter 5 (viz., NOx-occluded type three-way catalytic converter) before discharging to the open air. As is mentioned hereinabove, the NOx-occluded converter 5 has such a performance that when the exhaust gas from the engine shows a higher air/fuel ratio (viz., lean), it occludes NOx in the exhaust gas, while the exhaust gas shows a stoichiometric or lower air/fuel ratio (viz., rich), it releases NOx allowing reduction of the same with the aid of HC and CO in the exhaust gas.

A light duty three-way catalytic converter 21 is installed in the exhaust passage upstream of the converter 5. That is, under starting condition of the engine 1, the converter 21 functions to purify the exhaust gas.

A control unit 6 including a microcomputer is employed for controlling operation of the fuel injector 3 and the ignition plug 4. That is, the fuel injection timing and fuel injection quantity by the fuel injector 3 and the ignition timing by the ignition plug 4 are controlled by the control unit 6. More specifically, by processing information signals issued from various sensors, the control unit 6 issues a fuel injection signal (viz., injection pulse signal) to the fuel injector 3 and an ignition signal to the ignition plug 4 (viz., a power transistor for the plug 4).

In calculation of the fuel injection signal, a target air/fuel ratio of the combustible mixture is determined in accordance with an operating condition of the engine and a fuel injection quantity (viz., injection pulse width) is calculated so as to provide a combustible mixture of the target air/fuel ratio.

In the present invention, the target air/fuel ratio of the combustible mixture is set higher (viz., leaner) than stoichiometric ratio.

As the sensors, there are employed an air flow meter 7 for measuring the intake air quantity, a throttle sensor 8 for detecting an open degree of the throttle valve 2, a first air/fuel ratio sensor 10 for detecting an exhaust air/fuel ratio at a portion upstream of the NOx-occluded converter 5, a second air/fuel ratio sensor 11 for detecting an exhaust air/fuel ratio at a portion downstream of the NOx-occluded converter 5, a crank angle sensor 13 for detecting the rotation speed of the engine 1 and a water temperature sensor 12 for detecting a temperature of engine cooling water. Information signals of these sensors are inputted to the control unit 6.

The first air/fuel ratio sensor 10 is a sensor which, based on an oxygen concentration in the exhaust gas, detects the exhaust air/fuel ratio. This sensor 10 may be a stoichiometric ratio sensor (viz., oxygen sensor) which detects only a stoichiometric air/fuel ratio or a wide range air/fuel ratio sensor which detects the exhaust air/fuel ratio over a wide range.

The second air/fuel ratio sensor 11 is of the wide range air/fuel ratio sensor.

Usually, the control unit 6 controls the operation of the fuel injector 3 in such a manner that the exhaust air/fuel ratio detected by the first air/fuel sensor 10 is brought toward the target air/fuel ratio. For this control, an air/fuel ratio feedback correction factor "α" used for correcting the fuel injection quantity is determined by a Proportional-plus-Integral Control (viz., PI control) or the like.

While, as will be described in detail in the following, under a NOx-reduction treatment wherein NOx in the exhaust gas is being reduced by the NOx-occluded converter 5 with the aid of HC and CO, a so-called "correction-by-learning" is practically applied to the control while detecting the air/fuel ratio of the exhaust gas downstream of the NOx-occluded converter 5 by using the second air/fuel ratio sensor 11.

It is to be noted that the correction-by-learning means a correction which is effected based on learning.

Figure 2:
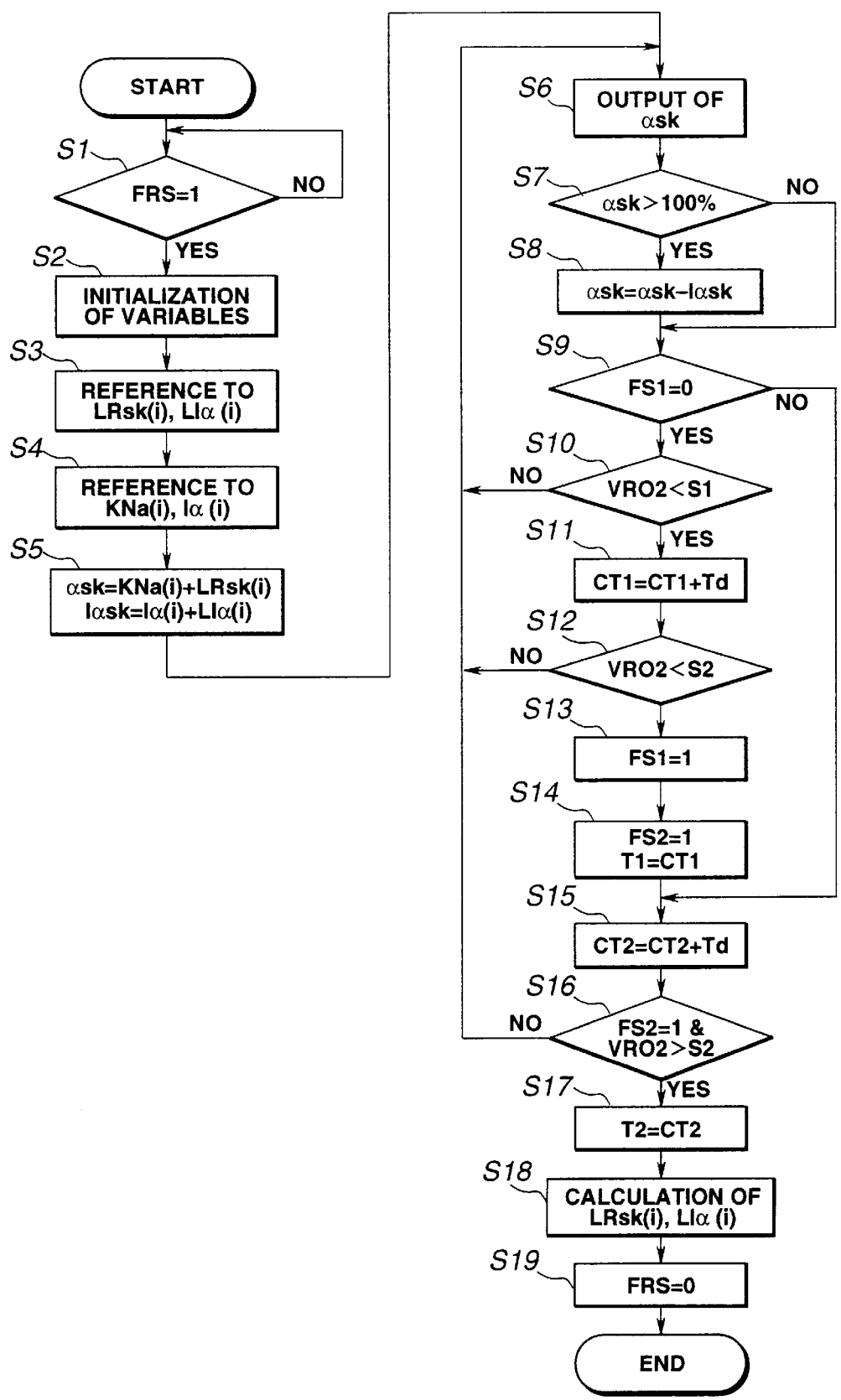
FIG. 2 is a flowchart showing programmed operation steps executed in a control unit employed in a first embodiment of the present invention.
Figure 3A:
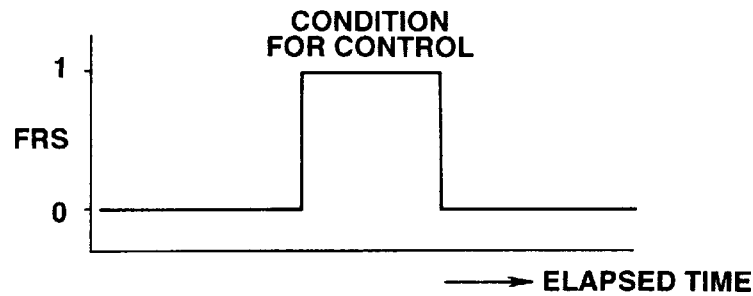
FIGS. 3A, 3B, 3C and 3D are time charts depicting the characteristics of a rich spike control employed in the first embodiment of the invention.
Figure 3B:
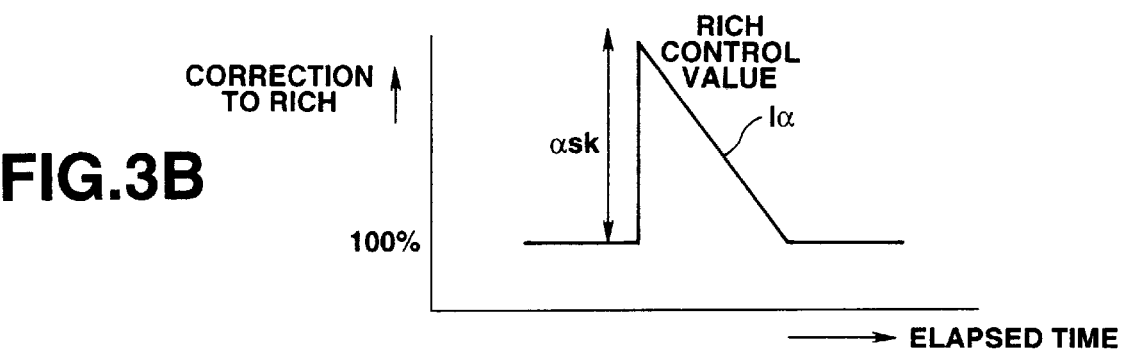
Figure 3C:
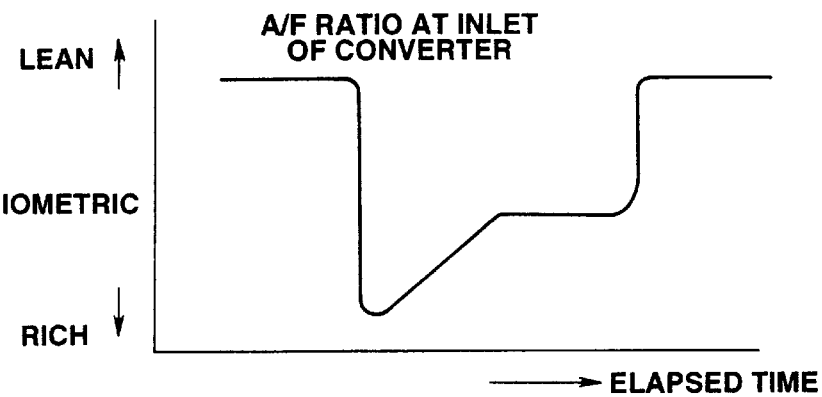
Figure 3D:
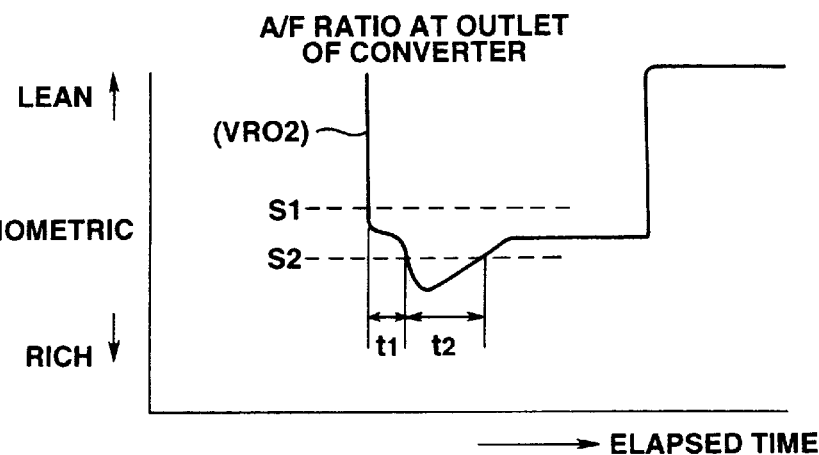

The rich spike learning control of the first embodiment is depicted by the flowchart of FIG. 2 and the characteristics of the s control are depicted by the time charts of FIGS. 3A to 3D.

In the flowchart of FIG. 2, at step S1, judgement is carried out as to whether a condition for effecting the NOx-reduction treatment has been established or not. That is, by judging the state of a flag "FRS", establishment of the condition for the NOx-reduction treatment is judged.

As is mentioned hereinabove, the NOx-occluded converter 5 has such a characteristic that when the exhaust gas from the engine has a higher air/fuel ratio (viz., lean), the converter occludes NOx in the exhaust gas, and when the exhaust gas shows a stoichiometric or lower air/fuel ratio (viz., rich), the converter 5 releases NOx allowing reduction of the same. When considering this fact, it is preferable to make the combustible mixture rich when the target exhaust air/fuel ratio has changed from a higher side (viz., lean side) to a stoichiometric and/or lower side (viz., rich side). Thus, when the target air/fuel ratio is changed to the stoichiometric and/or richer side from the leaner side, the flag "FRS" is set to 1 (one) indicating the establishment of the condition for the NOx-reduction treatment. When this mixture enrichment control is ended, the flag "FRS" is reset to 0 (zero).

In the invention, the switching of the target air/fuel ratio from the higher side (viz., leaner side) to the stoichiometric and/or the lower side (viz., richer side) is made depending on the operating condition (viz., acceleration, load, speed change) of the engine. In addition to the engine operating condition, when, even under a condition wherein a higher (viz., leaner) air/fuel ratio is to be set as the target air/fuel ratio, it is judged that the NOx-occluded converter 5 has reached to its maximum occluding capacity for NOx, the mixture enrichment control is temporarily carried out.

When the flag "FRS" indicates "1" due to establishment of the switching of the target air/fuel ratio from the leaner side to the stoichiometric and/or richer side, the operation flow goes to step S2. At this step S2, variables used in the control are initialized. For example, an after-mentioned measurement finish judging flag "FS1" for judging the finish of measurement of the stoichiometric-and-neighboring condition keeping time detected by the second air/fuel ratio sensor 11, and an after-mentioned measurement start judgement flat "FS2" for judging the start of measurement of the rich condition keeping time subsequently detected by the sensor 11 are both reset to 0 (zero).

At step S3, reference is made to both a rich level learnt value "LRsk(i)" and a rich condition keeping time learnt value "LIα(i)" which have been stored in a RAM of the microcomputer of the control unit 6. The rich level learnt value "LRsk(i)" is a maximum value having been provided at the start of the rich spike learning control. The rich condition keeping time learnt value "LIα(i)" is a value for learning the period for which a rich condition is maintained. In this embodiment, the rich condition keeping time learnt value "LIα(i)" is provided by learning a value (viz., differential value) which is provided by differentiating the above-mentioned maximum rich level. That is, for providing the value "LIα(i)", a differential control is carried out for reducing the maximum rich level. The rich condition keeping time is determined by a reducing rate of the maximum rich level, that is, the differential value of the same. Thus, by learning the differential value, the value "LIα(i)" is provided.

The learning is carried out in accordance with the amount of NOx which has been occluded in the NOx-occluded converter 5 at the start of the learning. More specifically, the learning is carried out in accordance with ranges of the amount of the occluded NOx. For example, the lean condition keeping time is measured before starting the learning, and the learning is effected each range "i" of the keeping time. With this, the learning accuracy is increased. If desired, the following measure may be employed, That is, an integrated amount of the exhausted NOx is estimated from the operating condition of the engine before the learning for estimating the amount of the occluded NOx, and then the learning is carried out each range of the estimated amount of occluded NOx.

At step S4, reference is made to both a rich level basic amount "Kna(i)" and a rich condition keeping time basic amount "Iα(i)" which have been stored in a ROM of the microcomputer of the control unit 6. The rich level basic amount "KNa(i)" and the rich condition keeping time basic amount "Iα(i)" are set each range of the above-mentioned lean condition keeping time or the estimated amount of occluded NOx.

Figure 4B:
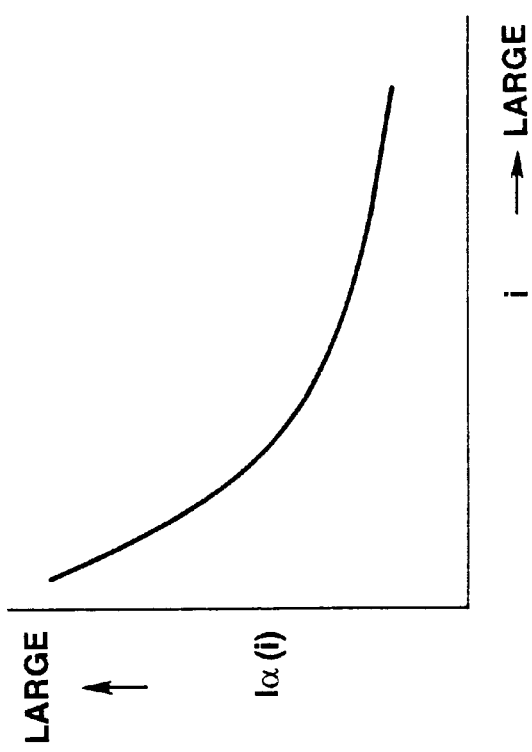
FIG. 4B is a graph showing the characteristics of a rich condition keeping time basic amount.
Figure 4A:
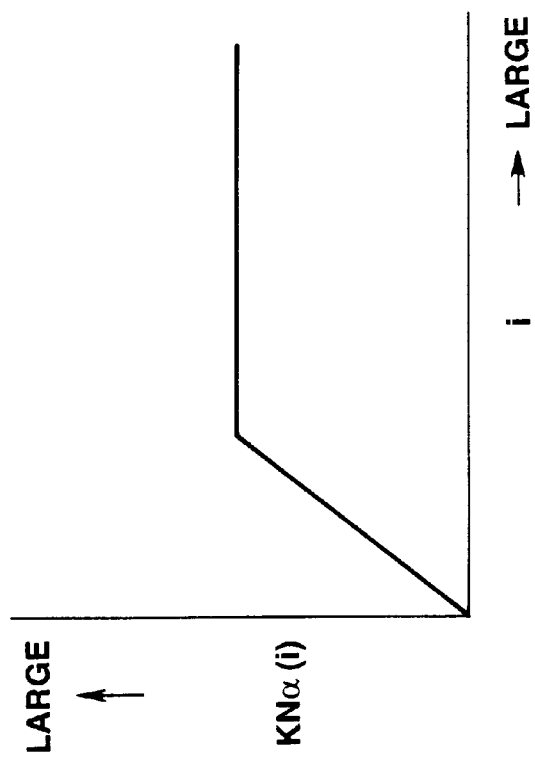
FIG. 4A is a graph showing the characteristics of a rich level basic amount.

The characteristics of these basic amounts "KNa(i)" and "Iα(i)" are depicted by the graphs of FIGS. 4A and 4B. In the rich level basic amount "KNa(i)", with increase of the lean condition keeping time or the estimated amount (i) of occluded NOx (viz., with increase of the amount of the occluded NOx), the amount of NOx released from the converter 5 at the initial stage is increased. Thus, a larger value is set as the basic amount "KNa(i)". However, considering the possibility of misfire, an upper limit is possessed by the basic amount "KNa(i)". In the rich condition keeping time basic amount "Iα(i)", with increase of the lean condition keeping time or the estimated amount (i) of the occluded NOx (viz., with increase of the amount of the occluded NOx), it becomes more necessary to increase the rich condition keeping time to fully establish the reduction of the occluded NOx. Accordingly, a smaller value is set to the basic amount "Iα(i)" which is the differential value in the reducing direction.

At step S5, from the above-mentioned basic amounts and learnt values, a rich level control amount "αsk" and a rich condition keeping time control amount "Iαsk" are derived by using the following equations (1) and (2).

$$\alpha sk = KNa(i) + LRsk(i) \tag{1}$$

$$I\alpha sk = I\alpha(i) + LI\alpha(i) \quad (2)$$

These amounts "αsk" and "Iαsk" are treated to have upper and lower limits. With this treatment, the NOx reduction control is carried out without being affected by the misfire and the torque variation.

At step S6, the rich level control amount "αsk" finally calculated at step S5 is outputted. The rich level control amount "αsk" is set as an air/fuel ratio control factor which is multiplied to a basic fuel injection quantity "Tp". It is to be noted that at the initial flow of the operation steps from step S5 to S6, the rich level control amount "αsk" calculated at step S5 is outputted as a maximum initial value.

At step S7, judgment is carried out as to whether or not the current rich level control amount "αsk" exceeds 100% which corresponds to a rich level control amount provided when the control is carried out under the stoichiometric air/fuel ratio. When the rich level control amount "αsk" exceeds 100%, the operation flow goes to step S8 to execute the following equation (3), so that the rich level control amount "αsk" is updated and the operation flow goes to step S9.

$$\alpha sk = \alpha sk - I\alpha sk \quad (3)$$

If the step S7 judges that the rich level control amount "αsk" is smaller than 100%, the operation flow goes to step S9 bypassing step S8.

At step S9, judgement is carried out as to whether the flag "FS1" is 0 (zero) or not, that is, whether the condition wherein the exhaust air/fuel ratio detected by the second air/fuel ratio sensor 11 is near stoichiometric is still kept or not.

When the flag "FS1" is 0 (zero), that is, when it is judged that the above-mentioned near stoichiometric condition is still kept, the operation flow goes to step S10. At this step S10, judgement is carried out as to whether an output value "VR02" of the second air/fuel ratio sensor 11 is lower than a first slice level "S1" or not. It is to be noted that the first slice level "S1" has been set to a slightly leaner side level with respect to the stoichiometric level.

When the step S10 judges that the output value "VR02" is higher than the first slice level "S1", that is, when the air/fuel ratio of the exhaust gas downstream of the NOx-occluded converter 5 has not been enriched to a level near the stoichiometric yet, the operation flow goes back to step S6 without measuring an after-mentioned stoichiometric and neighboring condition keeping time.

While, when the step S10 judges that the output value "VR02" becomes lower than the first slice level "S1", the operation flow goes to step S11. At this step, the value of a counter "CT1" for measuring the stoichiometric and neighboring condition keeping time is counted up by a given degree "Td". That is, in this step S11, the period for which the air/fuel ratio of the exhaust gas downstream of the NOx-occluded converter 5 is kept near stoichiometric is measured.

Then, at step S12, judgement is carried out as to whether the output value "VR02" of the second air/fuel ratio sensor 11 is lower than a second slice level "S2" or not. The second slice level "S2" has been set to a slightly richer level with respect to the stoichiometric level. When the step S12 judges that the output value "VR02" exceeds the second slice level "S2", that is, when the stoichiometric and neighboring condition is still kept, the operation flow goes back to step S6.

While, when the step S12 judges that the output value "VR02" becomes lower than the second slice level "S2", that is, when the air/fuel ratio of the exhaust gas downstream of the NOx-occluded converter 5 is shifted to a lower side (viz., richer side), the operation flow goes to step S13. At this step, the flag "FS1" is set to 1 (one) to finish the measurement of the stoichiometric and neighboring condition keeping time.

At stet S14, the flag "FS2" for judging the start of the measurement of the rich condition keeping time of the exhaust gas downstream of the NOx-occluded converter 5 is set to 1 (one), and at the same time, the current value "CT1" of the counter for counting the above-mentioned stoichiometric and neighboring condition keeping time is set as a stoichiometric and neighboring keeping time "T1".

At step S15, the value "CT2" of the counter for measuring the above-mentioned rich condition keeping time is counted up by a given degree "Td". That is, by this step, the period for which the air/fuel ratio of the exhaust gas downstream of the NOx-occluded converter 5 is kept rich is measured.

At step S16, judgment is carried out as to whether, during the period for which the rich condition is kept measured with the flag "FS2" indicating 1 (one), the output value "VR02" of the second air/fuel ratio sensor 11 exceeds the second slice level "S2" or not, that is, whether the air/fuel ratio of the exhaust gas downstream of the NOx-occluded converter 5 goes away from the rich condition or not.

While the exhaust air/fuel ratio is kept rich, the operation flow goes back to step S6 to repeat the above-mentioned steps to gradually bring the air/fuel ratio toward the lean side. Under this repeated operation of the steps, jumping from step S9 to S15 is made since the measurement of the stoichiometric and neighboring condition keeping time has been finished (that is, the flag "FS1" has been set to 1 (one)).

When, by gradually bringing the air/fuel ratio toward the lean side, the output value "VR02" of the second air/fuel ratio sensor 11 becomes lower than the second slice level "S2", that is, when it is judged that the air/fuel ratio of the exhaust gas downstream of the NOx-occluded converter 5 goes away from the richer condition, the operation flow goes to step S17. At this step, the current value "CT2" of the counter for measuring the rich condition keeping time is set as a rich condition keeping time "T2".

At step S18, based on the current stoichiometric and neighboring condition keeping time "T1" and the current rich condition keeping time "T2", learning on the rich level and learning on the rich condition keeping time are carried out. That is, by using the following technique, the above-mentioned rich level learnt value "LRsk(i)" and the rich condition keeping time learnt value "LIα(1)" are calculated or updated.

Figure 5:
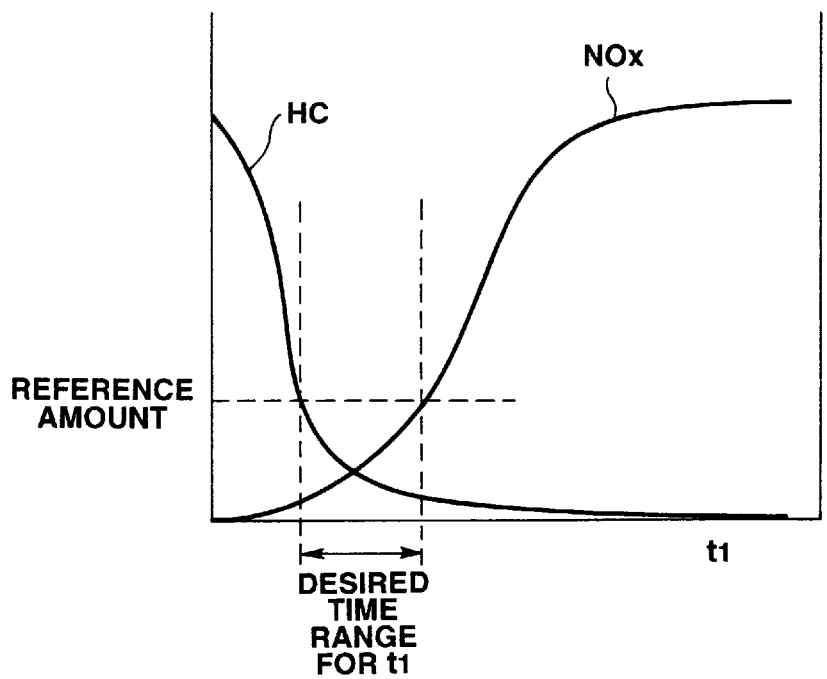
FIG. 5 is a graph showing the characteristics of the exhaust gas from the engine with respect to a stoichiometric-and-neighboring condition keeping time "t1" for which a stoichiometric or near stoichiometric air/fuel ratio is kept.

First, description will be directed to the rich level learnt value "LRsk(i)" with reference to the graph of FIG. 5.

As is seen from this graph, as the stoichiometric and neighboring condition keeping time "t1" increases, the amount of the exhausted NOx increases. While, as the time "t1" decreases, the amount of the exhausted HC (and CO) increases. In view of these facts, there is set a desired time range of the stoichiometric and neighboring condition keeping time "t1" within which both the amount of the exhausted NOx and the amount of the exhausted HC (and CO) are smaller than their respective reference amounts. When the stoichiometric and neighboring condition keeping time "t1" is within the time range, the learnt value "LRsk(i)" is kept unchanged. While, when the stoichiometric and neighboring condition keeping time "t1" is greater than the desired time range, the learnt value "LRsk(i)" is increased to increase the rich level for reducing the keeping time "t1". While, when the stoichiometric and neighboring condition keeping time "t1" is smaller than the desired time range, the learnt value "LRsk(i)" is reduced to reduce the rich level for increasing the keeping time "t1".

As is described hereinabove, when, with the stoichiometric and neighboring condition keeping time "t1" being greater than the desired time range, the rich level is increased, the stoichiometric and neighboring condition keeping time "t1" is reduced. This is because a larger value of the keeping time "t1" means that the interior of the catalyst section of the NOx-occluded converter 5 is still insufficient in having a full reduction atmosphere. Thus, when, for increasing the amount of HC and CO (viz., reducers), the rich level is increased, the period for which the air/fuel ratio is kept near stoichiometric becomes short.

Figure 6:
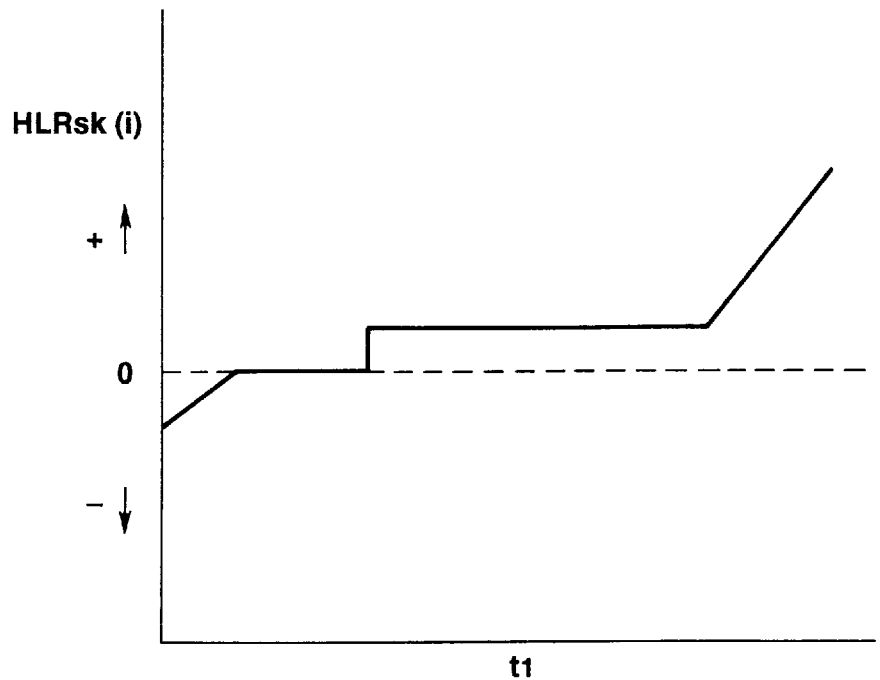
FIG. 6 is a graph showing the characteristics of a correction-by-learning amount for the rich level with respect to the stoichiometric-and-neighboring condition keeping time "t1"

With usage of the following equation (4), the above-mentioned learning is executed by using a correction-by-learning value "HLRsk(i)" which is set in such a manner as is depicted by the graph of FIG. 6.

$$LRsk(i)=LRsk(i)+HLRsk(i) \qquad (4)$$

Figure 7:
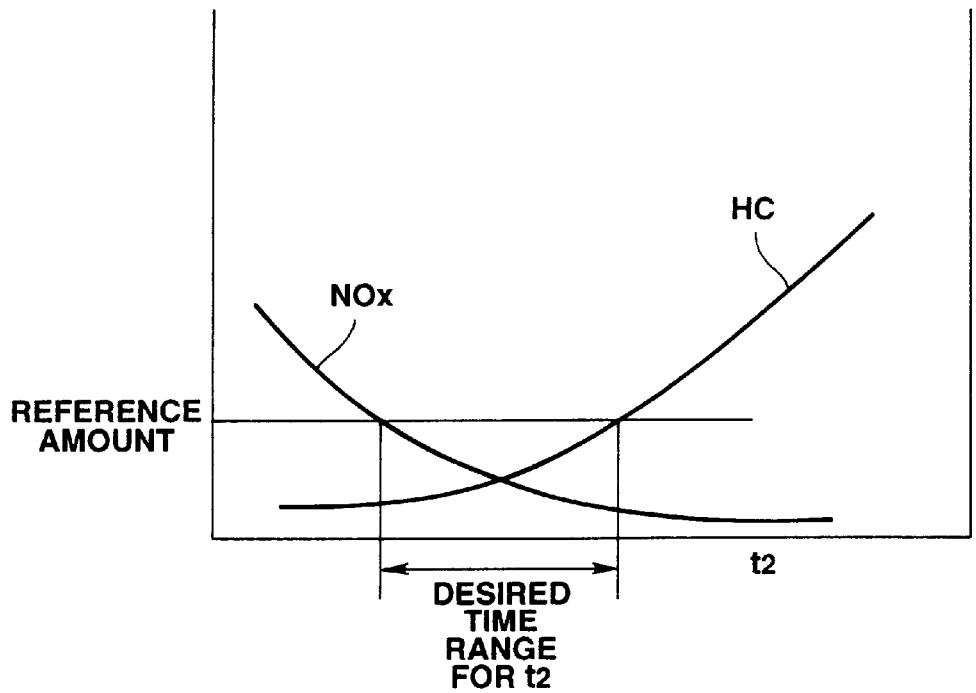
FIG. 7 is a graph showing the characteristics of the exhaust gas from the engine with respect to a rich condition keeping time "t2" for which a rich condition is kept.

In the following, description will be directed to the rich condition keeping time learnt value "LIα(i)" with reference to the graph of FIG. 7.

As is seen from this graph, as the rich condition keeping time "t2" increases, the amount of the exhausted HC (and CO) increases. While, as the keeping time "t2" decreases, the amount of the exhausted NOx increases. In view of these facts, there is set a desired time range of the rich condition keeping time "t2" within which both the amount of the exhausted HC (and CO) and the amount of the exhausted NOx are smaller than their respective reference amounts. When the rich condition keeping time "t2" is within the desired time range, the learnt value "LIα(i)" is kept unchanged. While, when the rich condition keeping time "t2" is greater than the desired time range, the learnt value "LIα(i)" is increased to increase the reducing rate of the rich level for reducing the keeping time "t2". While, when the rich condition keeping time "t2" is smaller than the desired time range, the learnt value "LIα(i)" is reduced to reduce the reducing rate of the rich level for increasing the keeping time "t2".

Figure 8:
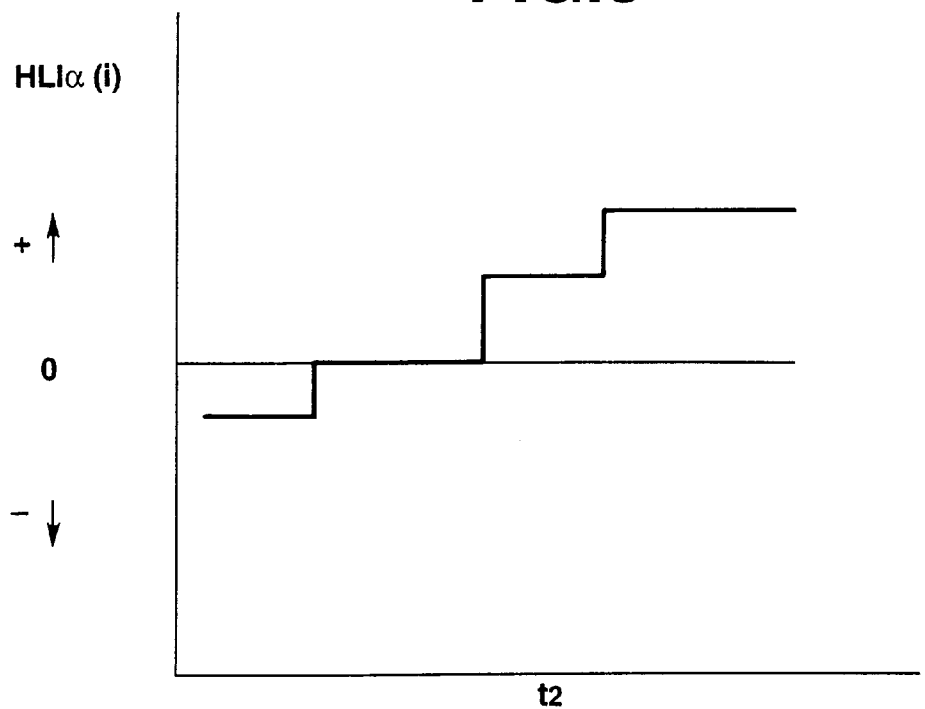
FIG. 8 is a graph showing the characteristics of a correction-by-learning amount for the rich level with respect to the rich condition keeping period "t2"
Figure 9A:
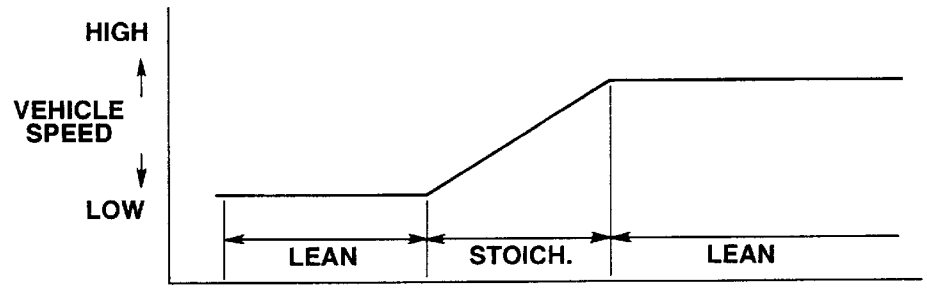
FIGS. 9A, 9B, 9C and 9D are time charts depicting the characteristics of the exhaust gas provided by the first embodiment and those provided by a conventional exhaust gas purifying system.
Figure 9B:
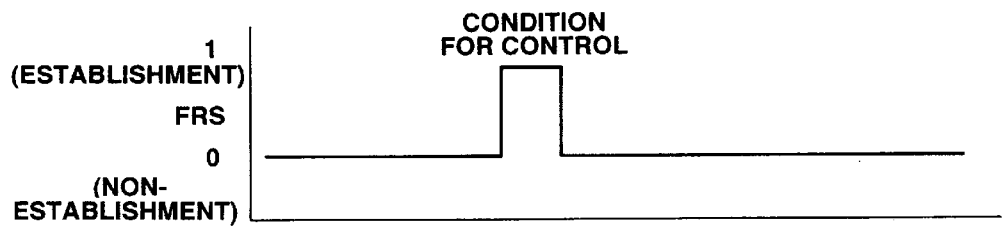
Figure 9C:
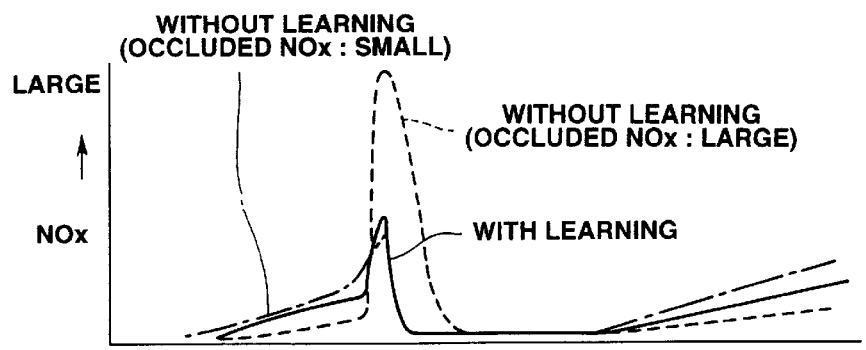
Figure 9D:
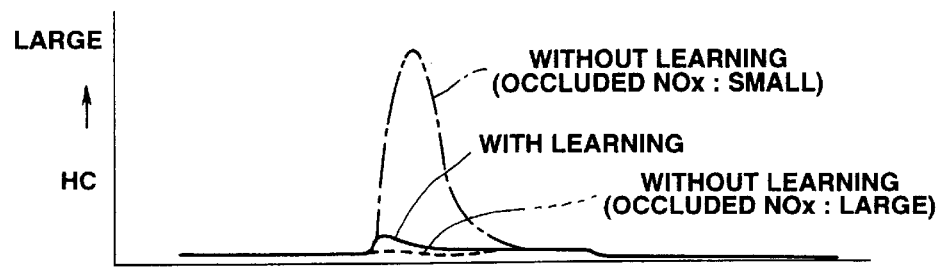

With usage of the following equation (5), the above-mentioned learning is executed by using a correction-by-learning value "HLIα(i)" which is set in such a manner as is depicted by the graph of FIG. 8.

$$LI\alpha(i)=LI\alpha(i)+HLI\alpha(i) \qquad (5)$$

After completion of updating the learnt values, the operation flow goes to step S19. At this step, the flag "FRS" is reset to 0 (zero) since the current NOx reduction control has been finished.

As is described hereinabove, by learning the rich level and the rich condition keeping time, both the amount of exhausted NOx and the amount of exhausted HC (and CO) can be reduced to levels lower than the respective reference amounts, as will be depicted by the graphs of FIGS. 9A to 9D.

Figure 10:
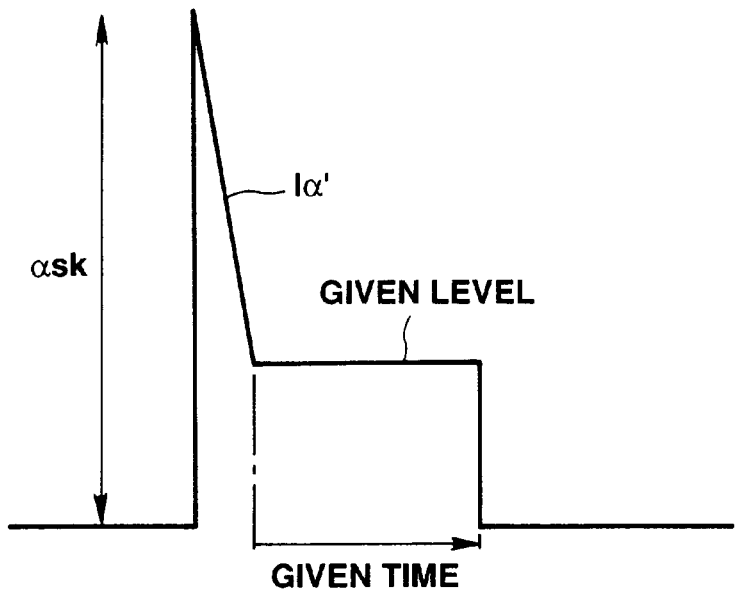
FIGS. 10 and 11 show respective modes for the rich spike action, which are usable in the rich spike control of the first embodiment.
Figure 11:
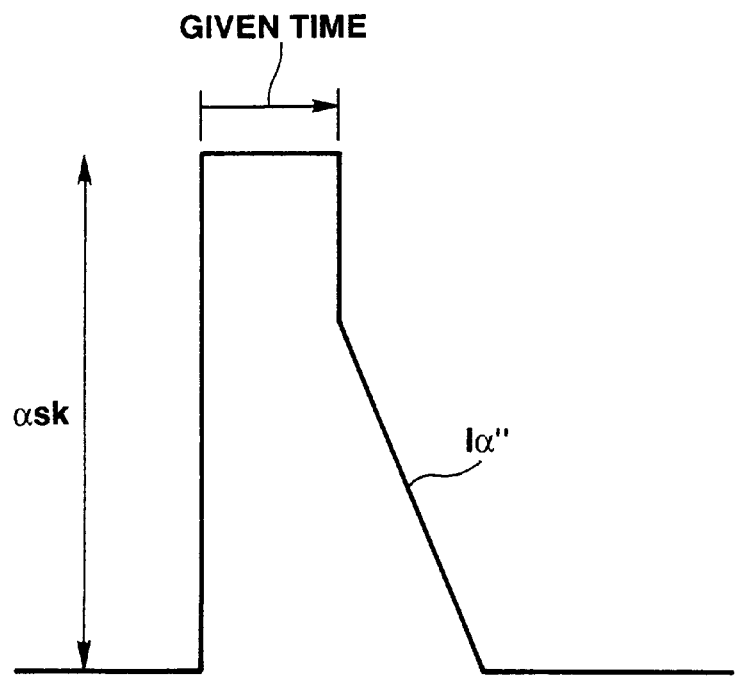

In the above-mentioned embodiment, the rich spike action takes such a mode that the rich level at the start of the rich spike control shows the maximum and thereafter the rich level is gradually reduced. If desired, the rich spike action may take other modes, such those as shown in FIGS. 10 and 11. In the mode of FIG. 10, the rich level showing the maximum at the start of the rich spike control is instantly reduced to a given level and keeps this given level for a given time. When this mode is practically employed in the first embodiment, the learning on an initial stage rich level is made in substantially the same manner as has been mentioned hereinabove, and the learning on the rich condition keeping time is so made that the given period for which the given rich level is kept is controlled in accordance with the rich condition keeping time. In the mode of FIG. 11, the initial rich level is kept for a given time, and thereafter, the rich level is sharply reduced to a certain level and then gradually reduced. When this mode is practically employed in the first embodiment, by measuring the stoichiometric and neighboring condition keeping time, the initial rich level is learned and corrected, and by measuring the rich condition keeping time, the rich level reducing speed after the given time is learned and corrected.

In the above-mentioned first embodiment, a wide range type air/fuel ratio sensor is used as the second air/fuel ratio sensor 11. However, if desired, the sensor 11 may be of a stoichiometric type (viz., oxygen sensor) which detects rich or lean condition of the exhaust air/fuel ratio in ON/OFF manner.

When the stoichiometric type sensor is used, it is impossible to directly detect the stoichiometric and neighboring condition of the exhaust gas. However, in this modification, the period needed when, after start of the rich spike control, the output of the sensor changes from a leaner side to a richer side may be used or estimated as the stoichiometric and neighboring condition keeping time. Alternatively, the period from the time when the output of the sensor changes from the leaner side to the richer side to the time when the output shows a rich peak may be used as the keeping time. In these cases, it is necessary to consider an inevitable time-delay caused by the time needed when a combustible mixture encountering the rich spike action reaches to the NOx-occluded converter 5. That is, in these cases, it is necessary to reduce or correct the actually measured time by a degree corresponding to the time-delay. Furthermore, if this correction on time-delay is set in accordance with the operating condition of the engine (viz., rotation speed), much precise control is achieved. In learning on the rich condition keeping time, the period for which the output of the sensor keeps the richer side after turning of the output from the leaner side to the richer side may be used or estimated as the rich condition keeping time.

Referring to FIGS. 12 to 17, there is shown a second embodiment of the present invention.

Figure 12:
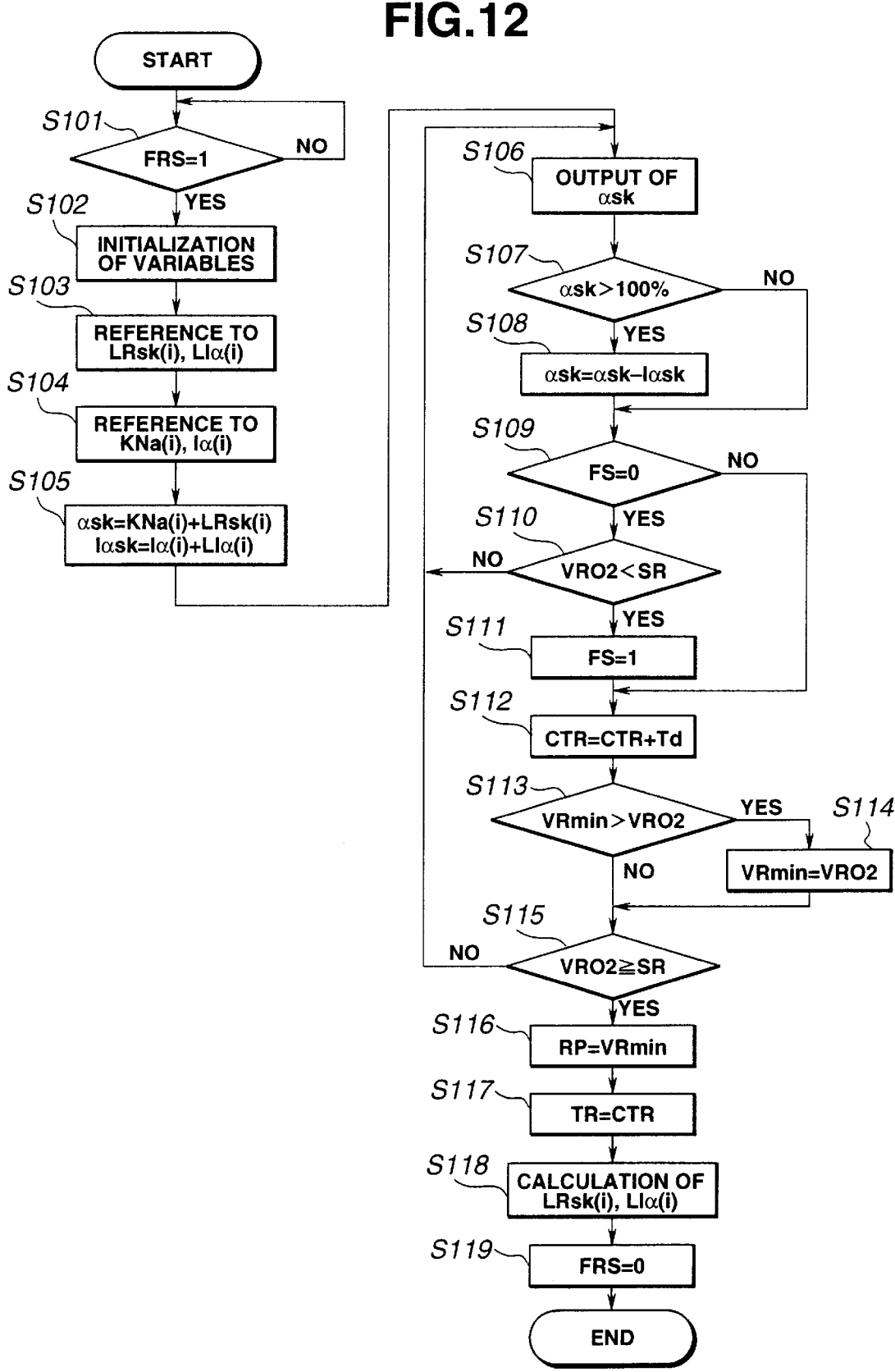
FIG. 12 is a flowchart showing programmed operation steps executed in a control unit employed in a second embodiment of the present invention.
Figure 13A:
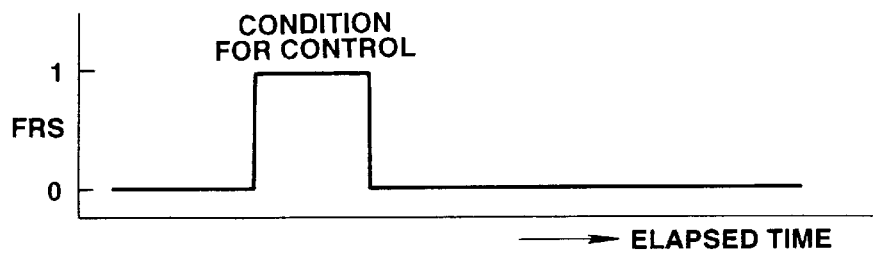
FIGS. 13A, 13B, 13C and 13D are time charts depicting the characteristics of a rich spike control employed in the second embodiment of the present invention.
Figure 13B:
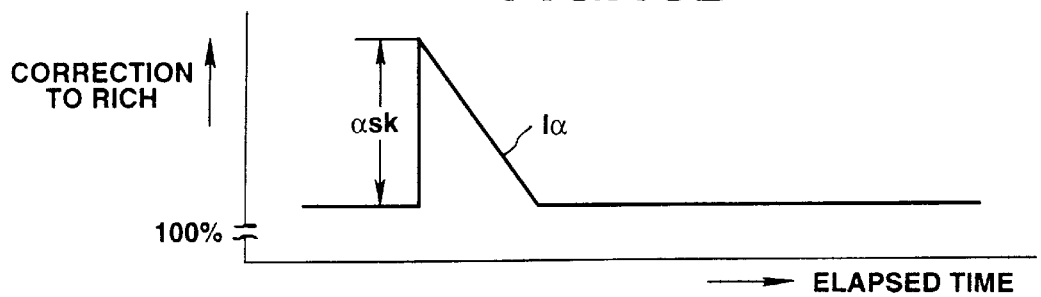
Figure 13C:
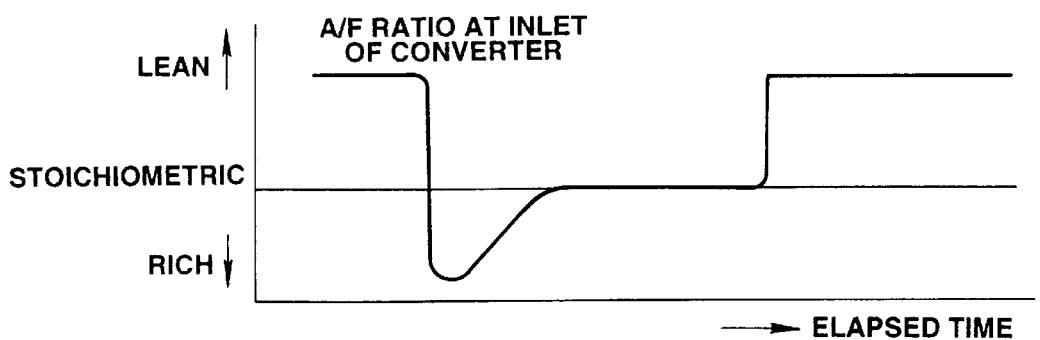
Figure 13D:
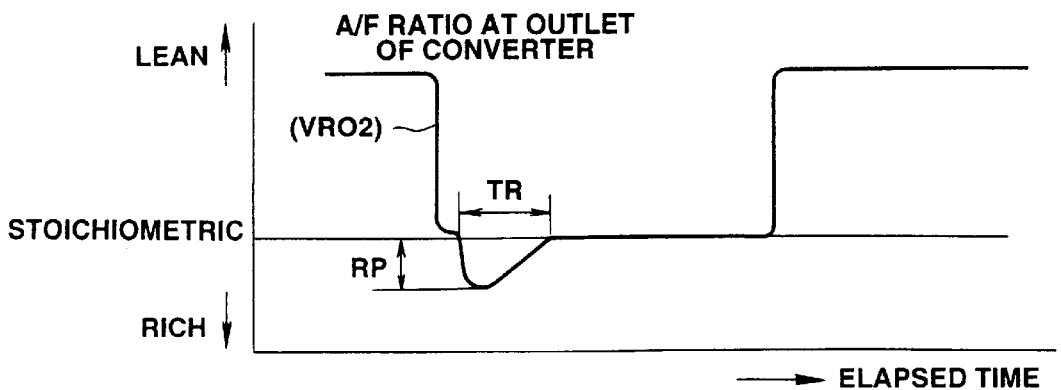

The rich spike learning control of the second embodiment is depicted by the flowchart of FIG. 12 and the characteristics of the control are depicted by the time charts of FIGS. 13A to 13D.

In the flowchart of FIG. 12, at step S101, similar to the first step S1 of the above-mentioned first embodiment, judgment is carried out as to whether a condition for effecting the NOx-reduction treatment has been established or not. That is, if the condition for the NOx-reduction treatment has been established, that is, when the flag "FRS" has been set to 1 (one), the operation flow goes to step S102 where variables used in the control are initialized. For example, an after-mentioned rich condition judging flag "FS" for judging a rich condition of the exhaust gas detected by the second air/fuel ratio sensor 11, an after-mentioned minimum value "VRmin" and a value of a counter "CTR" are reset to 0 (zero).

Then, the operation flow goes to steps S103, S104, S105, S106, S107 and S108. Since the contents of these steps are substantially the same as those of the steps S3, S4, S5, S6, S7 and S8 of the above-mentioned first embodiment of FIG. 2, description of them will be omitted.

At step S109, judgement is carried out as to whether the above-mentioned flag "FS" is 0 (zero) or not, that is, whether the exhaust air/fuel ratio detected by the second air/fuel ratio sensor 11 shows a richer level or not.

When the flag "FS" is 0 (zero), that is, when it is judged that the exhaust air/fuel ratio shows the richer level, the operation flow goes to step S110. At this step, judgement is carried out as to whether an output value "VR02" of the second air/fuel ratio sensor 11 is lower than a slice level "SR" or not. It is to be noted that the slice level "SR" has been set to a slightly richer side with respect to the stoichiometric level.

When the step S110 judges that the output value "VR02" is higher than the slice level "SR", that is, when the air/fuel ratio of the exhaust gas downstream of the NOx-occluded converter 5 has not been changed to a richer level yet, the operation flow goes back to step S106 without measuring an after-mentioned rich condition keeping time.

While, when the step S110 judges that the output value "VR02" becomes lower than the slice level "SR", that is, when it is judged that the air/fuel ratio of the exhaust gas downstream of the NOx-occluded converter 5 has been changed to the richer side, the operation flow goes to step S111. At this step, the rich condition judging flag "FS" is set to 1 (one). Then, the operation flow goes to step S112. At this step, the value of a counter "CTR" for measuring the rich condition keeping time is counted up by a given degree "Td". That is, in this step S112, the period for which the air/fuel ratio of the exhaust gas downstream of the NOx-occluded converter 5 is kept rich is measured.

Then, at step S113, judgement is carried out as to whether the output "VR02" of the second air/fuel ratio sensor 11 becomes lower than the minimum value "VRmin" or not. An initial value has been set to the minimum value "VRmin". However, depending on the result of the step S113, the minimum value is written over or updated. That is, when, at step S113, the judgment "VR02<VRmin" is established, the operation flow goes to step S114. At this step, the minimum value "VRmin" is written over or updated by the output value "VR02". That is, the minimum value of the output value "VR02" is constantly updated.

Then, the operation flow goes to step S115. At this step, judgement is carried out as to whether the output value "VR02" of the second air/fuel ratio sensor 11 becomes higher than the slice level "SR" or not. If NO, that is, when the air/fuel ratio of the exhaust gas downstream of the converter 5 keeps the richer condition, the operation flow goes back to step 106 to repeat the above-mentioned operation steps. Under this repeated operation of the steps, jumping from step S109 to step S112 is made since the rich condition judgement is still kept (that is, the flag "FS" has been set to 1 (one)). With these steps, the air/fuel ratio is gradually brought toward a lean side.

When, by gradually bringing the air/fuel ratio toward the learn side, the output value "VR02" of the second air/fuel ratio sensor 11 becomes higher than the slice level "SR", that is, when it is judged that the air/fuel ratio of the exhaust gas downstream of the NOx-occluded converter 5 goes away from the richer condition, the operation flow goes to step S116. At this step, the minimum value "VRmin" lastly written over at step S114 is set as a peak value "RP" of the richer condition. Then, the operation flow goes to step S117. At this step, the current value "CTR" of the counter for measuring the rich condition keeping time is set as a rich condition keeping time "TR".

At step S118, based on the peak value "RP" of the richer condition and the rich condition keeping time "TR", learning on the rich level and learning on the rich condition keeping time are carried out. That is, by using the following technique, the above-mentioned rich level learnt value "LRsk(i)" and the rich condition keeping time learnt value "LIα(i)" are calculated or updated.

Figure 14:
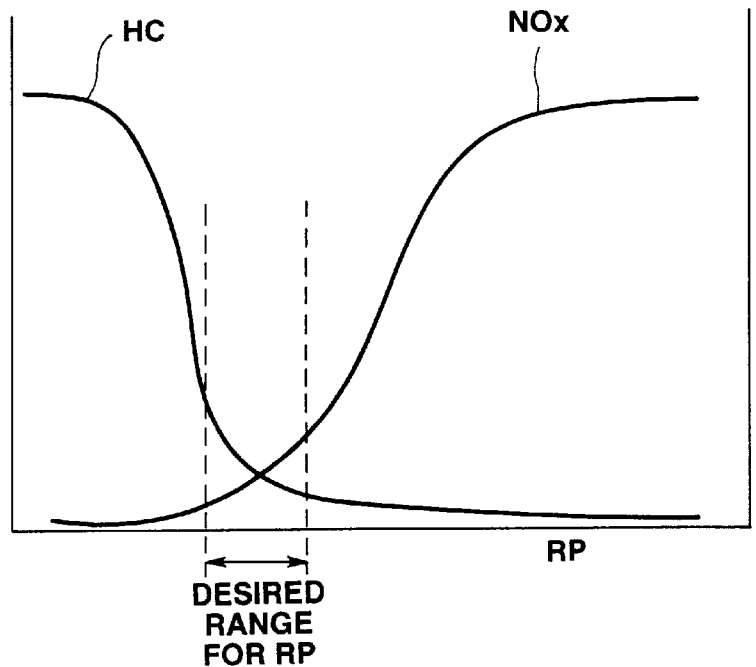
FIG. 14 is graph showing, in the second embodiment, the characteristics of the exhaust gas from the engine with respect to a rich peak value "RP"

First, description will be directed to the rich level learnt value "LRsk(i)" with reference to the graph of FIG. 14.

As is seen from this graph, as the rich peak value "RP" increases, the amount of the exhausted NOx increases. While, as the rich peak value "RP" decreases, the amount of the exhausted HC (and CO) increases. In view of these facts, there is set a S desired range of the rich peak value "RP" within which both the amount of the exhausted NOx and the amount of the exhausted HC (and CO) are smaller than their respective reference amounts. When the rich peak value "RP" is within the desired range, the learnt value "LRsk(i)" is kept unchanged. While, when the rich peak value "RP" is smaller than the desired range, the learnt value "LRsk(i)" is increased to increase the rich level for increasing the rich peak value "RP". While, when the rich peak value "RP" is greater than the desired range, the "LRsk(i)" is decreased to decrease the rich level for decreasing the rich peak value "RP".

Figure 15:
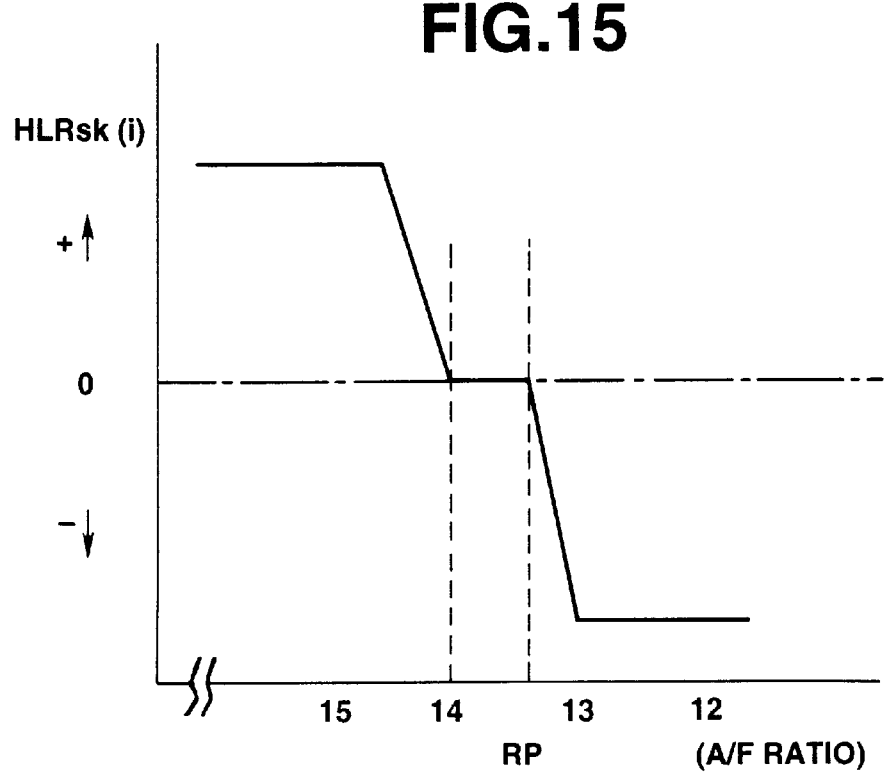
FIG. 15 is a graph showing, in the second embodiment, the characteristics of a correction-by-learning amount for the rich level with respect to the rich peak value "RP"

With usage of the above-mentioned equation (4), the above-mentioned learning is executed by using a correction-by-learning value "HLRsk(i)" which is set in such a manner as is depicted by the graph of FIG. 15.

Figure 16:
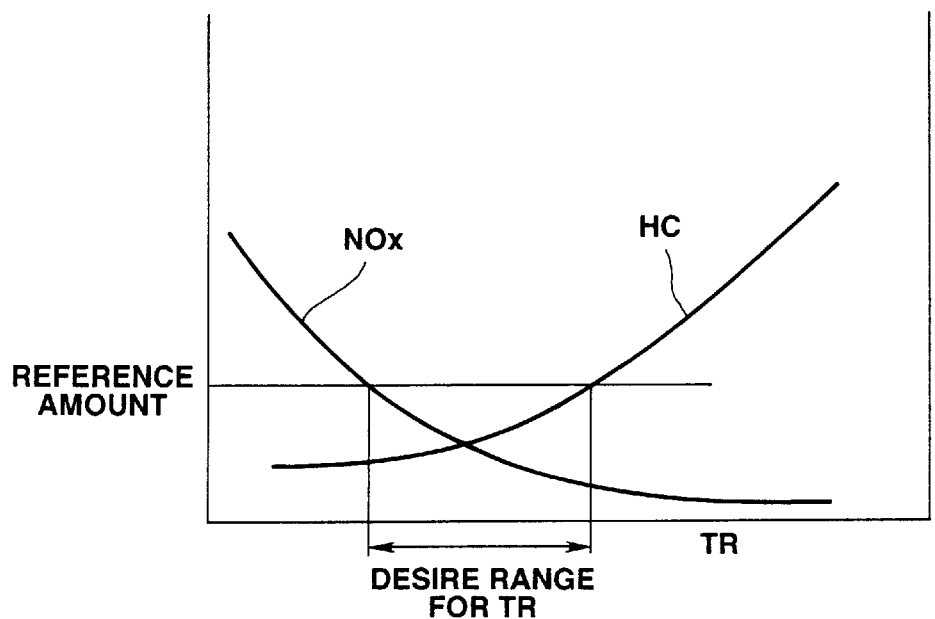
FIG. 16 is a graph showing, in the second embodiment, the characteristics of the exhaust gas from the engine with respect to a rich condition keeping time "TR"

In the following, description will be directed to the rich condition keeping time learnt value "LIα(i)" with reference to the graph of FIG. 16.

As is seen from this graph, as the rich condition keeping time "TR" increases, the amount of the exhausted HC (and CO) increases. While, as the keeping time "TR" decreases, the amount of the exhausted NOx increases. In view of these facts, there is set a desired time range of the rich condition keeping time "TR" within which both the amount of the exhausted HC (and CO) and the amount of the exhausted NOx are smaller than their respective reference amounts. When the rich condition keeping time "TR" is within the time range, the learnt value "LIα(i)" is kept unchanged. While, when the rich condition keeping time "TR" is greater than the desired time range, the learnt value "LIα(i)" is increased to increase the reducing speed of the rich level for decreasing the keeping time "TR". While, when the rich condition keeping time "TR" is smaller than the desired time range, the learnt value "LIα(i)" is decreased to decrease the reducing speed of the rich level for increasing the keeping time "TR".

Figure 17:
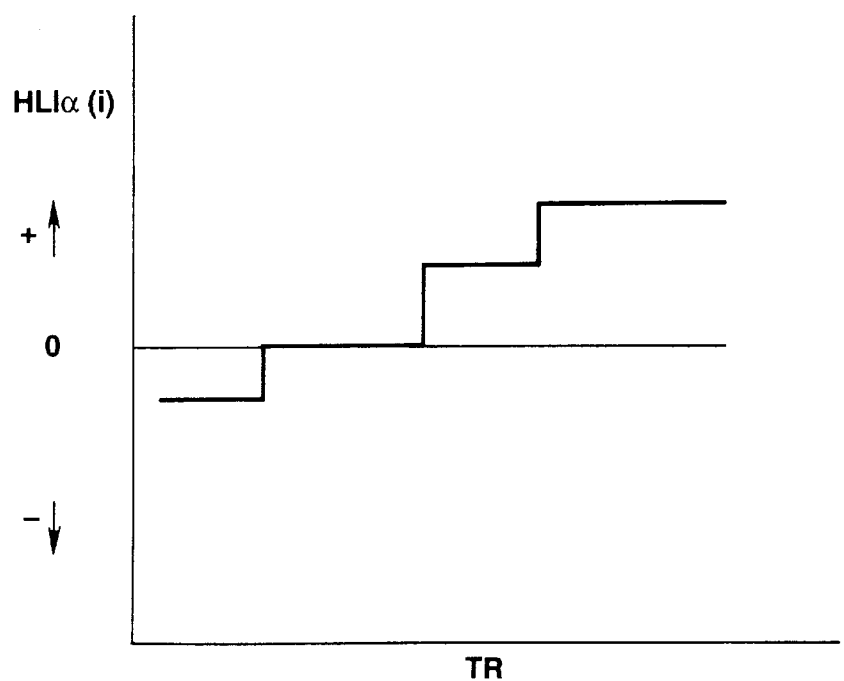
FIG. 17 is a graph showing, in the second embodiment, the characteristics of a correction-by-leaning amount for the rich level with respect to the rich condition keeping time "TR"

With usage of the above-mentioned equation (5), the above-mentioned learning is executed by using a correction-by-learning value "HLIα(i)" which is set in such a manner as is depicted by the graph of FIG. 17.

After completion of the above-mentioned updating of the learnt value, the operation flow goes to step S119. At this step, the flag "FRS" is reset to 0 (zero) since the current NOx reduction control has been finished.

As is described hereinabove, also in the second embodiment, by learning the rich level and the rich condition keeping time, both the amount of exhausted NOx and the amount of exhausted HC (and CO) can be reduced to levels lower than the respective reference amounts.

In the second embodiment, there is employed such a mode that the rich level at the start of the rich spike control shows the maximum and thereafter the rich level is gradually reduced.

If desired, the rich spike action may take such a mode that the rich level showing the maximum at the start of the rich spike control is reduced at a fixed reducing rate to a given level and keeps this given level for a given time.

In the following, a third embodiment of the present invention to which such mode is practically applied will be described.

Referring to FIGS. 18 to 21, there is shown the third embodiment of the present invention.

Figure 18:
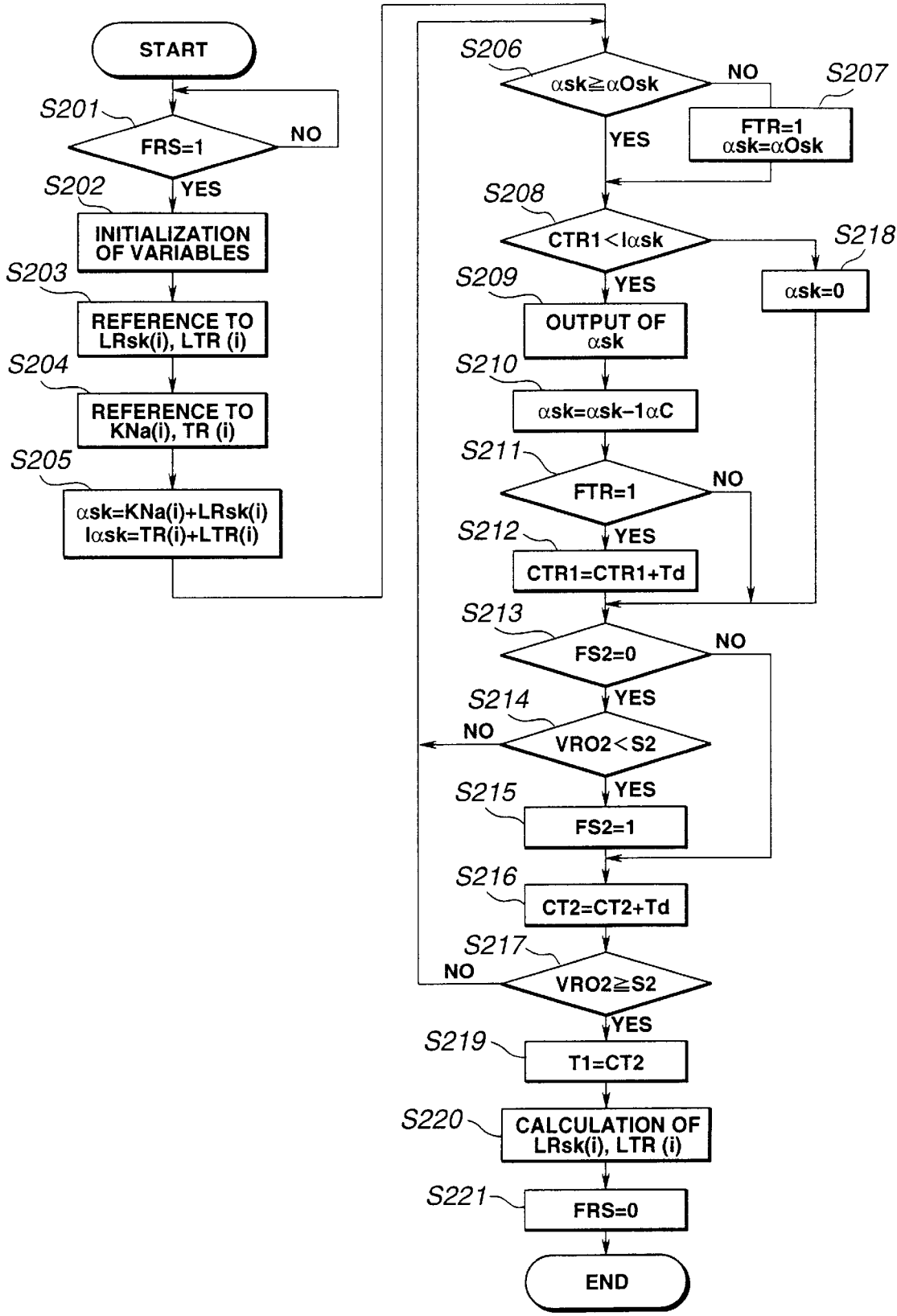
FIG. 18 is a flowchart showing programmed operation steps executed in a control unit employed in a third embodiment of the present invention.

The rich spike learning control of this third embodiment is depicted by the flowchart of FIG. 18 and the characteristics of the control are depicted by the time charts of FIGS. 22A to 22D.

In the flowchart of FIG. 18, steps S201 and S202 are substantially the same as the steps S1 and S2 (see FIG. 2) of the above-mentioned first embodiment. That is, if, at step S201, the flag "FRS" has been set to 1 (one) due to establishment of the condition for the NOx-reduction treatment, the operation flow goes to step S202 to initialize variables used in the control.

At step S203, reference is made to both a rich level learnt value "LRsk(i)" and a rich keeping time learnt value "LIα(i)" which are stored in a RAM of the microcomputer of the control unit 6.

It is to be noted that similar to the case of the first embodiment of FIG. 2, the rich level learnt value "LRsk(i)" is a maximum value having been provided at the start of the rich spike leaning control. The rich condition keeping time learnt value "LTR(i)" is a value for learning the period for which a rich condition is maintained.

As is described hereinabove, in this third embodiment, there is employed such a mode that the rich level showing the maximum at the start of the rich spike control is reduced at a fixed reducing rate to a given level and keeps the given level for a given time. That is, the rich condition keeping time is determined in accordance with the given period for which the given level is kept. Thus, the value "LTR(i)" is provided by learning the given time.

At step S204, reference to made to both a rich level basic amount "KNa(i)" and a rich condition keeping time basic amount "TR(i)" which are stored in a ROM of the microcomputer of the control unit 6. The rich condition keeping time basic amount "TR(i)" is set each range (i). The amount of NOx occluded by the converter 5 increases as the lean condition keeping time increases. Thus, it becomes necessary to increase the rich condition keeping time as the lean condition keeping time increases, and thus, the rich condition keeping time basic amount "LR(i)" is set to increase gradually.

At step S205, from the above-mentioned basic amounts and learnt values, a rich level control amount "αsk" and a rich condition keeping time control amount "Iαsk" are derived by using the following equations (6) and (7).

$$\alpha sk = KNa(i) + LRsk(i) \quad (6)$$

$$I\alpha sk = TR(i) + LTR(i) \quad (7)$$

These amounts "αsk" and "Iαsk" are treated to have upper and lower limits, like in the case of the above-mentioned first embodiment.

At step S206, judgment is carried out as to whether or not the rich level control amount "αsk" is equal to or greater than a given level "α0sk" (viz., a level corresponding to even enrichment). As will be described in detail hereinafter, the rich level control amount "αsk" is provided by reducing the maximum rich level at a fixed reducing rate. The maximum rich level is provided at the start of the control. If YES at step S206, the operation flow goes to step S208. While, If NO at step S206, that is, when the rich level control amount "αsk" is smaller than the given level "α0sk", the operation flow goes to step S207. At this step, an even enriching condition judging flag "FTR" is set to 1 (one) and the rich level control amount "αsk" is fixed to the given level "α0sk". Then, the operation flow goes to step S208.

At step S208, judgement is carried out as to whether or not a count value "CTR1" of an after-mentioned even enriching condition keeping time is smaller than the rich condition keeping time "Iαsk" derived at step S205. If YES, that is, when the count value "CTR1" is smaller than the keeping time "Iαsk", the operation flow goes to step S209.

At step S209, the current rich level control amount "αsk" finally calculated is outputted. It is to be noted that at the initial flow of the operation steps from step S205 to step S206, the rich level control amount "αsk" calculated at step S205 is outputted as a maximum initial value.

At step S210, the rich level control amount "αsk" is subtracted by a given amount "IαC" which corresponds to the even reducing rate to provide an updated rich level control amount "αsk" which will be outputted in a subsequent flow of the programmed operation steps.

At step S211, judgement is carried out as to whether the even enriching condition has been established or not by using the even enriching condition judging flag "FTR" of step S207. If YES, that is, when such condition has been established, the operation flow goes to step S212. At this step, the value "CTR1" of the counter for measuring the even enriching condition keeping time is counted up by a given degree "Td". Then, the operation flow goes to step S213.

At step S213, with checking a flag "FS2", judgement is carried out as to whether the air/fuel ratio of the exhaust gas downstream of the NOx-occluded converter 5 has been changed to a richer side or not. That is, when the air/fuel ratio shows a richer condition, the flag "FS2" is set to 1 (one), while when the air/fuel ratio shows a condition other than the richer condition, the flag "FS2" is set to 0 (zero). If YES at step S213, that is, when the flag "FS2" indicates 0 (zero), the operation flow goes to step S214. At this step, judgment is carried out as to whether or not an output of the second air/fuel sensor 11 becomes smaller than a slice level "S2". The slice level "S2" is set to judge a richer condition. If YES, that is, when it is judged that the exhaust air/fuel ratio shows a richer condition, the operation flow goes to step S215. At this step, the above-mentioned flag "FS2" is set to 1 (one). Then, the operation flow goes to step S216. At this step, the value "CT2" of the counter for measuring the rich condition keeping time is counted up by a given degree "Td". That is, the step S216 has such a function as to measure the rich condition keeping time.

At step S217, judgement is carried out as to whether or not the output "VR02" of the second air/fuel ratio sensor 11 has become higher than the slice level "S2", that is, whether or not the exhaust air/fuel ratio has gone away from the richer condition.

If NO at step S217, that is, when the exhaust air/fuel ratio has not gone away from the richer condition yet, the operation flow goes back to step S206 to repeat the above-mentioned steps. When, under this repeated operation of the steps, the step S208 shows that the even enriching condition keeping time "CTR1" has reached the rich condition keeping time "Iαsk" to which correction has been made by learning, the operation flow goes to step S218 to make the rich level control amount "αsk" 0 (zero) for finishing the rich spike action. After this, the operation flow goes to step S213 to S216 for measuring the rich condition keeping time to learn.

If YES at step S217, that is, when the exhaust air/fuel ratio has gone away from the richer condition, the operation flow goes to step S219. At this step, the value "CT2" of the counter is set as a rich condition keeping time "T1".

At step S220, based on the rich condition keeping time "T1", learning on the rich level and learning on the rich condition keeping time are carried out. That is, by using the following technique, the above-mentioned rich level learnt value "LRsk(i)" and the rich condition keeping time learnt value "LTR(i)" are calculated or updated.

Figure 19:
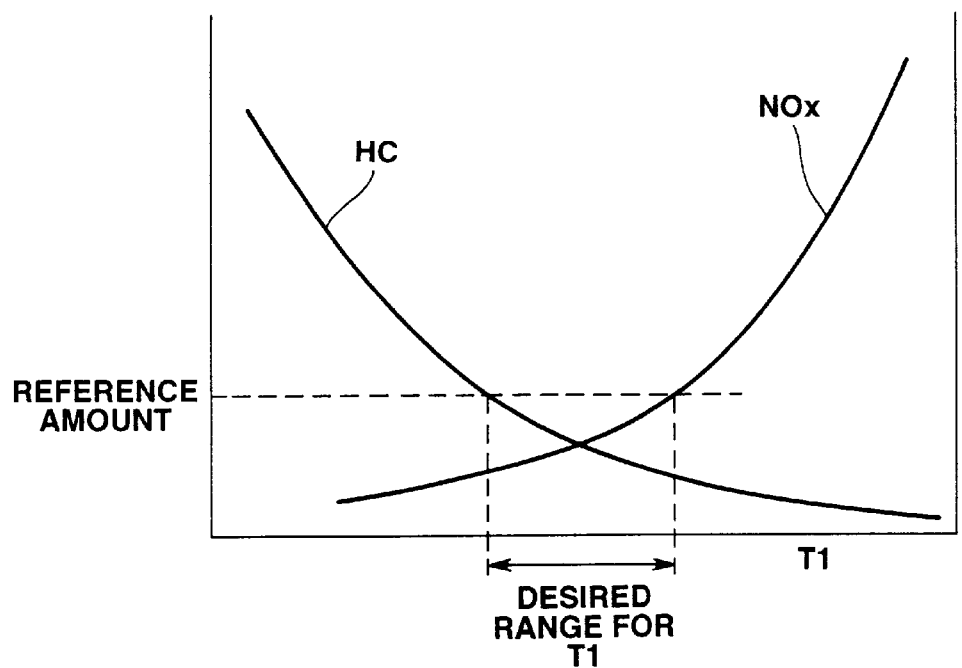
FIG. 19 is a graph showing, in the third embodiment, the characteristics of the exhaust gas from the engine with respect to a rich condition keeping time "T1"

First, description will be directed to the rich level learnt value "LRsk(i)" with reference to the graph of FIG. 19.

As is seen from this graph, as the rich condition keeping time "T1" increases, the amount of exhausted NOx increases. While, as the rich condition keeping time "T1" decreases, the amount of the exhausted HC (and CO) increases. In view of these facts, there is set a desired time range of the rich condition keeping time "T1" within which both the amount of the exhausted NOx and the amount of the exhausted HC (and CO) are smaller than their respective reference amounts. When the rich condition keeping time "T1" is within the desired time range, the learnt value "LRsk(i)" is kept unchanged. While, when the rich condition keeping time "T1" is smaller than the desired time range, the learnt value "LRsk(i)" is increased to increase the rich level for increasing the time "T1". While, when the rich condition keeping time "T1" is greater than the desired time range, the learnt value "LRsk(i)" is decreased to decrease the rich level for decreasing the time "T1".

Figure 20:
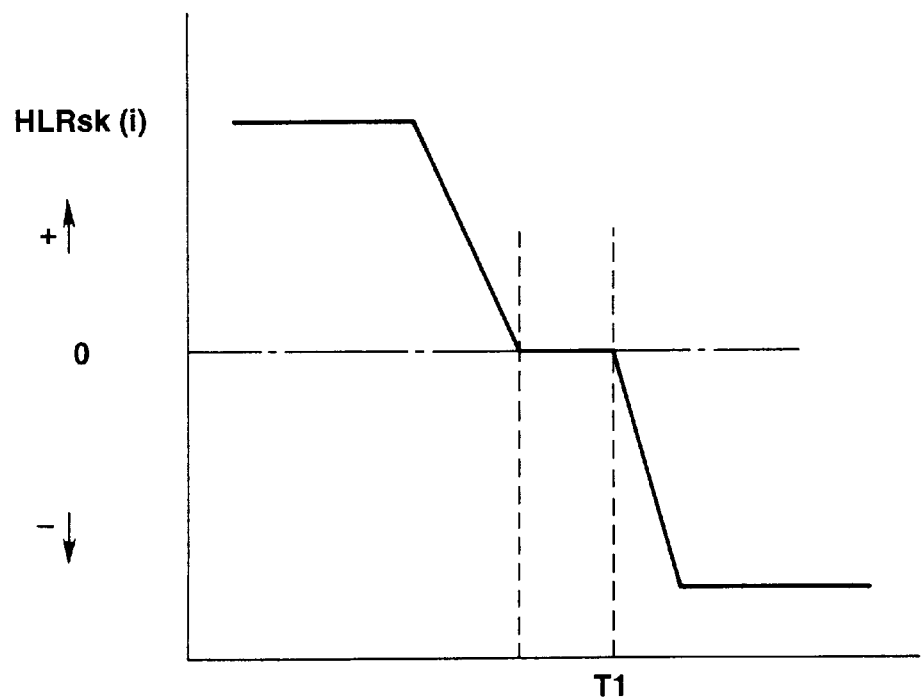
FIG. 20 is a graph showing, in the third embodiment, the characteristics of a correction-by-learning amount for the rich level with respect to the rich condition keeping time "T1"

With usage of the above-mentioned equation (4), the above-mentioned learning is executed by using a correction-by-learning value "HLRsk(i)" which is set in such a manner as is depicted by the graph of FIG. 20.

In the following, description will be directed to the rich condition keeping time learnt value "LTR(i)".

Like the case of the above-mentioned rich level learnt value "LRsk(i)", when the rich condition keeping time "T1" is within the desired time range, the learnt value "LTR(i)" is kept unchanged. While, when the rich condition keeping time "T1" is greater than the desired time range, the learnt value "LTR(i)" is decreased to decrease the even enriching condition keeping time for decreasing the time "T1". While, the rich condition keeping time "T1" is smaller than the desired time range, the learnt value "LTR(i)" is increased to increase the even enriching condition keeping time for increasing the time "T1".

Figure 21:
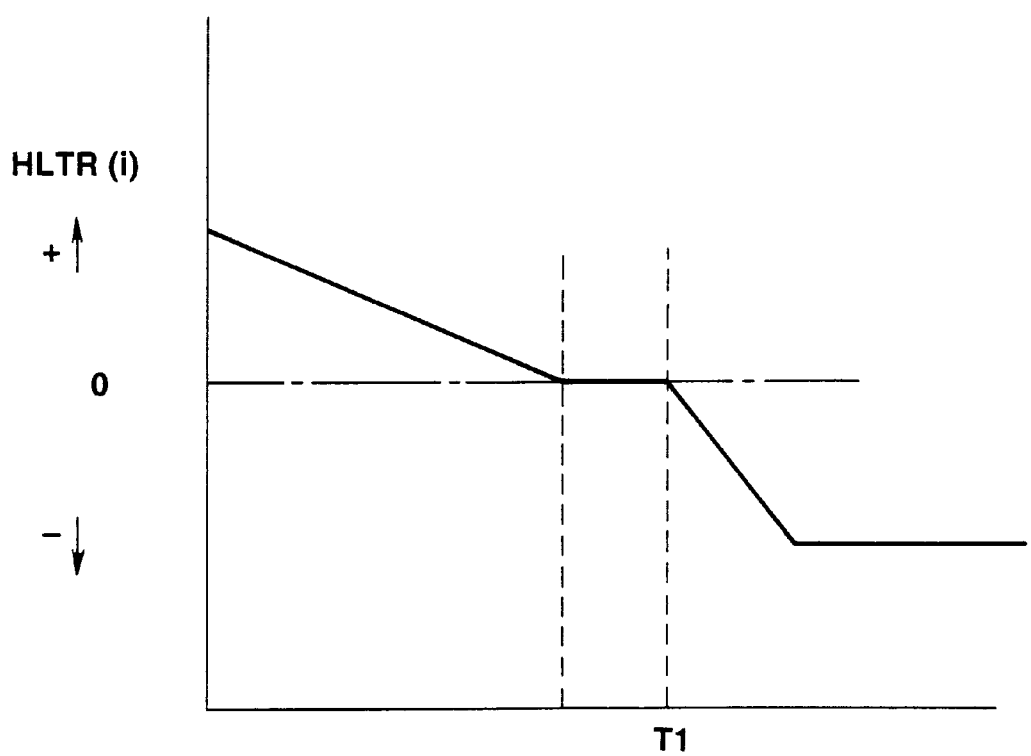
FIG. 21 is a graph showing, in the third embodiment, the characteristics of a correction-by-learning amount for a rich condition keeping time with respect to the rich condition keeping time "T1"
Figure 22A:
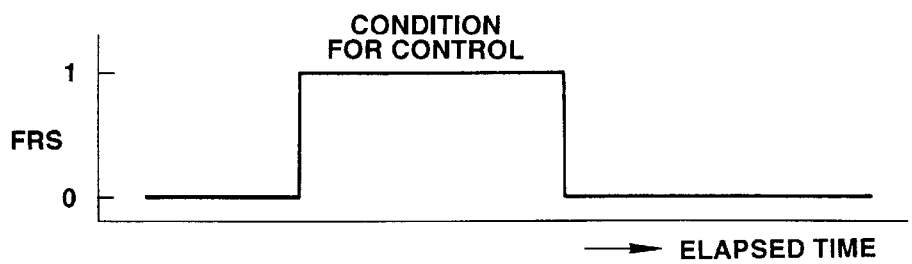
FIGS. 22A, 22B, 22C and 22D are time charts depicting the characteristics of a rich spike control employed in the third embodiment of the present invention.
Figure 22B:
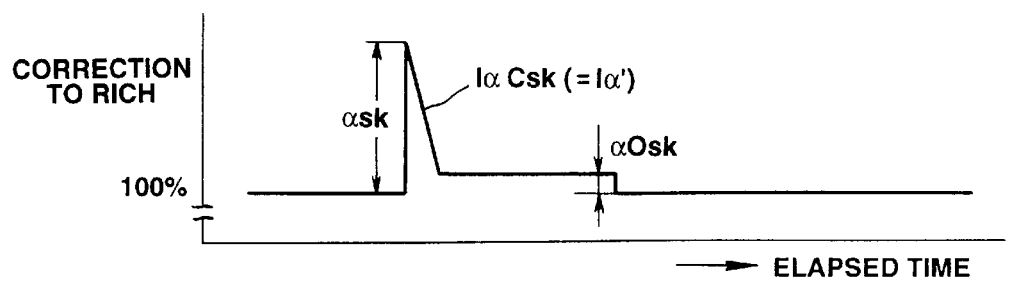
Figure 22C:
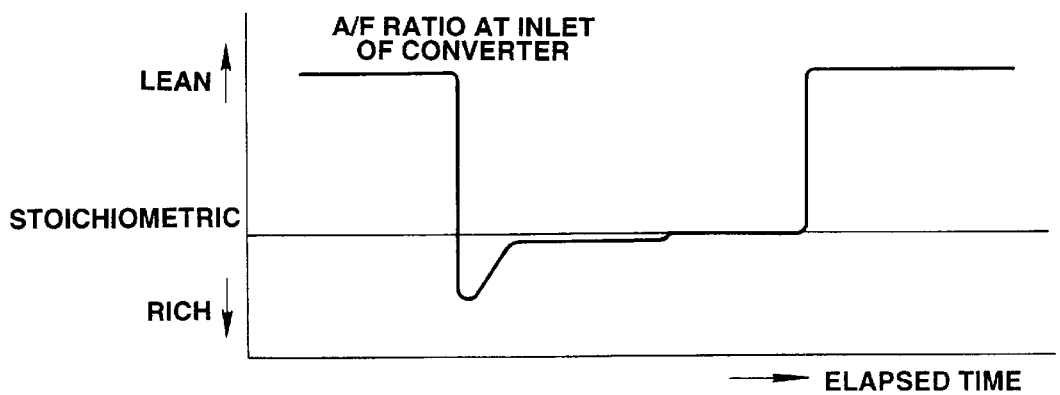
Figure 22D:
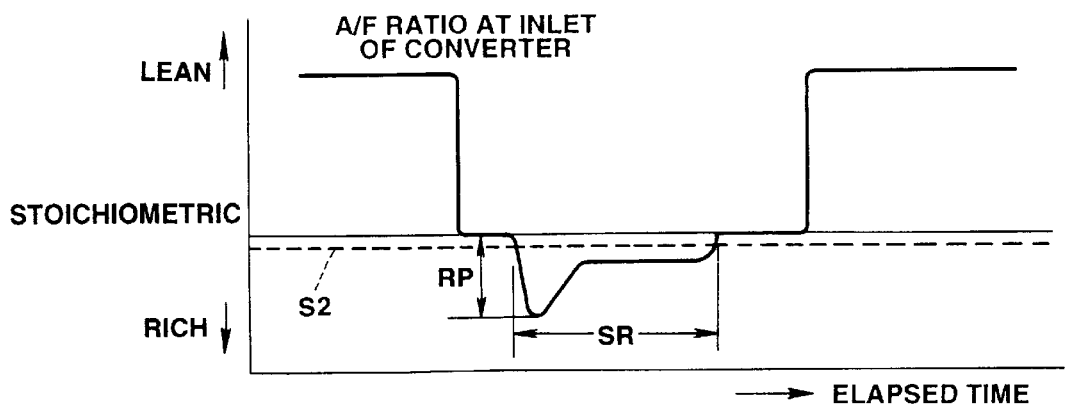

With usage of the following equation (8), the above-mentioned learning is executed by using a correction-by-learning value "HLTR(i)" which is set in such a manner as is depicted by the graph of FIG. 21.

$$LTR(i)=LTR(i)+HLTR(i) \qquad (8)$$

After completion of updating the learnt values, the operation flow goes to step S221. At this step, the flag "FRS" is reset to 0 (zero) since the current NOx reduction control has been finished.

As is described hereinabove, also in the third embodiment, by learning the rich level and the rich condition keeping time, both the amount of exhausted NOx and the amount of exhausted HC (and CO) can be reduced to levels lower than the respective reference amounts.

In the above-mentioned second and third embodiments, a wide range type air/fuel ratio sensor is used as the second air/fuel ratio sensor 11. However, if desired, the sensor 11 may be of a stoichiometric type (viz., oxygen sensor).

When the stoichiometric type sensor is used, a control is needed wherein the rich level provided at the start of the rich spike action is variable and the rich level is reduced at a fixed reducing rate. In this control, when the rich level is changed, the rich condition keeping time is proportionally changed. Thus, by making a correction-by-learning to the rich level, correction-by-learning to the rich condition keeping time is made at the same time.

By measuring the period for which the stoichiometric type sensor indicates a richer condition of the exhaust gas, the rich condition keeping time is detected and at the same time estimation of the rich condition peak value of the exhaust air/fuel mixture is provided. That is, it is estimated that with increase of the rich condition keeping time, the rich condition peak value is increased.

Thus, the rich condition keeping time is measured by the stoichiometric type sensor, and the correction-by-learning is so made as to decrease the rich level and the rich condition keeping time as the rich condition keeping time increases. With this technique, the NOx reduction control is carried out keeping both the amount of exhausted NOx and the amount of exhausted HC (and CO) lower than the respective reference amounts.

The contents of Japanese Patent Applications 9-225327 and 9-225328 both filed Aug. 21, 1997 are hereby incorporated by reference.

What is claimed is:

1. In an internal combustion engine having an air/fuel mixture supply device by which a combustible mixture fed to the engine is provided,
an exhaust gas purifying system comprising:
a NOx-occluded type catalytic converter installed in an exhaust passage through which an exhaust gas from the engine passes, said converter occluding NOx in the exhaust gas when the exhaust gas shows a leaner air/fuel ratio and releasing and reducing NOx with an aid of HC and CO in the exhaust gas when the exhaust gas shows a richer or stoichiometric air/fuel ratio;
an air/fuel ratio sensor disposed downstream of said converter for detecting an exhaust air/fuel ratio of the exhaust gas downstream of said converter; and
a control device for controlling an air/fuel ratio of said combustible mixture, said control device including:
a first section for making the air/fuel ratio of the combustible mixture richer or stoichiometric to cause said converter to effect a NOx-reduction treatment on the absorbed or adsorbed NOx; and
a second section for learning and correcting the condition of the NOx-reduction treatment, based on the exhaust air/fuel ratio detected by said sensor under the NOx-reduction treatment,
said second section including:
a rich level learning means which learns and corrects a rich level of the combustible mixture under the NOx-reduction treatment, based on a first period for which the air/fuel ratio of the exhaust gas detected by said sensor is kept near stoichiometric; and
a rich condition keeping time learning means which learns and corrects a rich condition keeping time for which the air/fuel ratio of said combustible mixture is kept rich under the NOx-reduction treatment, based on a second period for which the air/fuel ratio detected by said sensor is kept rich, said second period appearing after said first period.

2. An exhaust gas purifying system as claimed in claim 1, in which a rich spike control for conducting said NOx-reduction treatment is so made that said rich level at the start of the control shows the maximum value and thereafter gradually decreases, in which said rich level learning means learns and corrects the maximum rich level provided at the start of the control, and in which said rich condition keeping time learning means learns and corrects a reducing rate at which said rich level is reduced.

3. An exhaust gas purifying system as claimed in claim 1, in which a rich spike control for conducting said NOx-reduction treatment is so made that said rich level at the start of the control shows the maximum value and thereafter decreases to a given level and then keeps said given level for a given time, in which said rich level learning means learns and corrects the maximum rich level provided at the start of the control, and in which said rich condition keeping time learning means leans and corrects said given time.

4. An exhaust gas purifying system as claimed in claim 1, in which said air/fuel ratio sensor is of a type which detects the exhaust air/fuel ratio continuously, and in which said first and second periods are derived by comparing respective corresponding slice levels with the exhaust air/fuel ratio detected by said sensor.

5. An exhaust gas purifying system as claimed in claim 1, in which said air/fuel ratio sensor is of a stoichiometric type which detects rich or lean condition of the exhaust air/fuel ratio in ON/OFF manner, in which said first period is derived by detecting a period needed when the output of said sensor changes from a leaner side to a richer side or a period from the time when the output of the sensor changes from the leaner side to the richer side to the time when output shows a rich peak, and in which said second period is derived from a period for which the exhaust air/fuel ratio detected by said sensor is kept rich.

6. An exhaust gas purifying system as claimed in claim 1, in which operation of said rich level learning means and that of said rich condition keeping time learning means are carried out in accordance with ranges of the operation condition of the engine.

7. An exhaust gas purifying system as claimed in claim 6, in which the ranges are derived, before the correction by learning, by a lean condition keeping time for which the exhaust air/fuel ratio detected by said sensor is kept lean.

8. An exhaust gas purifying system as claimed in claim 6, in which the ranges are derived, before the correction by leaning, by an amount of NOx which is estimated to be occluded by said converter in accordance with the operation condition of the engine.

9. An exhaust gas purifying system as claimed in claim 1, in which said rich level and said rich condition keeping time are treated to have upper and lower limits respectively.

10. In an internal combustion engine having an air/fuel mixture supply device by which a combustible mixture fed to the engine is provided,
an exhaust gas purifying system comprising:
NOx-occluded type catalytic converter installed in an exhaust passage through which an exhaust gas from the engine passes, said converter occluding NOx in the exhaust gas when the exhaust gas shows a leaner air/fuel ratio and releasing and reducing NOx with an aid of HC and CO in the exhaust gas when the exhaust gas shows a richer or stoichiometric air/fuel ratio;
an air/fuel ratio sensor disposed downstream of said converter for detecting an exhaust air/fuel ratio of the exhaust gas downstream of said converter; and
a control device for controlling an air/fuel ratio of said combustible mixture, said control device including:
a first section for making the air/fuel ratio of the combustible mixture richer or stoichiometric to cause said converter to effect a NOx-reduction treatment on the absorbed or adsorbed NOx; and
a second section for learning and correcting the condition of the NOx-reduction treatment, based on the exhaust air/fuel ratio detected by said sensor under the NOx-reduction treatment,
said second section including:
a NOx-reduction treatment control amount learning means which learns and corrects both a rich level of said combustible mixture under the NOx-reduction treatment and a rich condition keeping time for which the air/fuel ratio of said combustible mixture is kept rich under the NOx-reduction treatment, based on at least one of a rich indicating peak value of the exhaust air/fuel ratio detected by said sensor and a period for which the exhaust air/fuel ratio detected by said sensor is kept rich.

11. An exhaust gas purifying system as claimed in claim 10, in which a rich spike control for conducting said NOx-reduction treatment is so made that the rich level at the start of the control shows the maximum value and thereafter gradually decreases, in which the correction-by-learning of the rich level by said NOx-reduction treatment control amount learning means is to learn and correct the maximum rich level provided at the start of the control and in which the correction-by-learning of the rich condition keeping time by said NOx-reduction treatment control amount learning means is to learn and correct a reducing rate at which said rich level is reduced.

12. An exhaust gas purifying system as claimed in claim 11, in which said air/fuel ratio sensor is of a type which detects the exhaust air/fuel ratio continuously, in which said NOx-reduction treatment control amount learning means learns and corrects s said rich level based on the rich indicating peak value of the exhaust air/fuel ratio detected by said sensor, and in which said NOx-reduction treatment control amount learning means learns and corrects said rich condition keeping time based on a rich condition keeping period which is derived by comparing the exhaust air/fuel ratio detected by said sensor with a predetermined slice level.

13. An exhaust gas purifying system as claimed in claim 10, in which a rich spike control for conducting said NOx-reduction treatment is so made that said rich level at the start of the control shows the maximum value and thereafter decreases to a given level and then keeps said given level for a given time, in which the correction-by-learning of said rich level by said NOx-reduction treatment control amount learning means is to learn and correct the maximum rich level provided at the start of the control and in which the correction-by-learning of said rich condition keeping time is to learn and correct said given time for which said given level is kept.

14. An exhaust gas purifying system as claimed in claim 13, in which said air/fuel ratio sensor is of a type which detects the exhaust air/fuel ratio continuously, and in which said NOx-reduction treatment control amount learning means learns and corrects both said rich level and said rich condition keeping time based on a rich condition keeping period which is derived by comparing the exhaust air/fuel ratio detected by the sensor with a predetermined slice level.

15. An exhaust gas purifying system as claimed in claim 10, in which said air/fuel ratio sensor is of a stoichiometric type which detects rich or lean condition of the exhaust air/fuel ratio in ON/OFF manner, and in which said NOx-reduction treatment control amount learning means learns and corrects both said rich level and said rich condition keeping time based on a rich condition keeping period for which the exhaust air/fuel ratio detected by said sensor is kept rich.

16. An exhaust gas purifying system as claimed in claim 10, in which the correction-by-learning of said rich level and that of said rich level keeping time are carried out in accordance with ranges of the operation condition of the engine.

17. An exhaust gas purifying system as claimed in claim 16, in which the ranges are derived, before the correction-by-learning, by a lean condition keeping time for which the exhaust air/fuel ratio detected by said sensor is kept lean.

18. An exhaust gas purifying system as claimed in claim 16, in which the ranges are derived, before the correction-by-learning, by an amount of NOx which is estimated to be occluded by said converter in accordance with the operation condition of the engine.

19. An exhaust gas purifying system as claimed in claim 10, in which rich level and said rich condition keeping time are treated to have upper and lower limits respectively.

20. In an internal combustion engine having an air/fuel mixture supply device by which a combustible mixture fed to the engine is provided, an exhaust gas purifying system comprising:

a NOx-occluded type catalytic converter installed in an exhaust passage through which an exhaust gas from the engine passes, said converter occluding NOx in the exhaust gas when the exhaust gas shows a leaner air/fuel ratio and releasing and reducing NOx with an aid of HC and CO in the exhaust gas when the exhaust gas shows a richer or stoichiometric air/fuel ratio;

an air/fuel ratio sensor disposed downstream of said converter for detecting an exhaust air/fuel ratio of the exhaust gas downstream of said converter; and a control device for controlling an air/fuel ratio of said combustible mixture, said control device including:

a first section for making the air/fuel ratio of the combustible mixture richer or stoichiometric to cause said converter to effect a NOx-reduction treatment on the absorbed or adsorbed NOx; and a second section for learning and correcting the condition of the NOx-reduction treatment, based on the exhaust air/fuel ratio detected by said sensor under the NOx-reduction treatment, said second section including:

a rich level learning unit which learns and corrects a rich level of the combustible mixture under the NOx-reduction treatment, based on a first period for which the air/fuel ratio of the exhaust gas detected by said sensor is kept near stoichiometric; and a rich condition keeping time learning unit which learns and corrects a rich condition keeping time for which the air/fuel ratio of said combustible mixture is kept rich under the NOx-reduction treatment, based on a second period for which the air/fuel ratio detected by said sensor is kept rich, said second period appearing after said first period.

* * * * *